United States Patent [19]

Bolling et al.

[11] Patent Number: 4,967,368
[45] Date of Patent: Oct. 30, 1990

[54] EXPERT SYSTEM WITH KNOWLEDGE BASE HAVING TERM DEFINITION HIERARCHY

[75] Inventors: Richard W. Bolling, Brookline, N.H.; Louis P. Tychonievich, Fallston, Md.; Geoffrey E. Margrave, Lexington, Mass.; David F. Shannon, Nashua; Eric S. Rustici, Londonderry, both of N.H.

[73] Assignee: Wang Laboratories, Inc., Lowell, Mass.

[21] Appl. No.: 371,434

[22] Filed: Jun. 5, 1989

Related U.S. Application Data

[63] Continuation-in-part of Ser. No. 30,250, Mar. 24, 1987, Pat. No. 4,916,633, which is a continuation of Ser. No. 766,860, Aug. 16, 1985, abandoned.

[51] Int. Cl.⁵ ............................................. G06F 15/18
[52] U.S. Cl. ...................................................... 364/513
[58] Field of Search .................................. 364/513, 300

[56] References Cited

U.S. PATENT DOCUMENTS

| | | | |
|---|---|---|---|
| 3,715,730 | 2/1973 | Smith et al. | 364/200 |
| 3,716,840 | 2/1973 | Masten et al. | 364/200 |
| 4,286,330 | 8/1981 | Isaacson | 364/900 |
| 4,290,114 | 9/1981 | Sinary | 364/900 |
| 4,599,692 | 7/1986 | Tan et al. | 364/513 |
| 4,649,515 | 3/1987 | Thompson et al. | 364/513 |

Primary Examiner—Allen MacDonald
Attorney, Agent, or Firm—Michael H. Shanahan

[57] ABSTRACT

A definition-based expert system and expert system shell. The expert system shell creates a knowledge base consisting of terms and their definitions, the definitions making up a hierarchy of definitions in which each definition depends only on terms defined at lower levels in the hierarchy or on term-independent values. Expert responses are obtained from the system by evaluating the terms. When a term is evaluated, all of the term-independent values and the values of all of the terms in its definition are obtained. The definitions include operators specifying operations which are to be performed when the defined term is evaluated. The operators include causing other systems operable in the digital computer system in which the expert system is operating to operate. The definitions further include table operators. Base table operators define terms representing tables and columns in the tables and permit loading of the tables. Query table operators define terms representing tables defined from base tables or other query tables. Column operators permit operations involving all of the fields of a column. The expert system is further able to respond to "don't know" values in a fashion which depends on the significance of the "don't know" value for the definition of the term.

20 Claims, 9 Drawing Sheets

| TERM 206 | DESC 205 |
|---|---|
| FRAUD | KNOWING — MISREPRESENTATION AND DETRIMENTAL — RELIANCE |
| KNOWING — MISREPRESENTATION | MISREPRESENTATION AND DEFENDANT — KNEW — MISREPRESENTATION |
| MISREPRESENTATION | ASK YES—NO "DID HE TELL YOU ANYTHING THAT WASN'T TRUE?" |
| DEFENDANT — KNEW — MISREPRESENTATION | ASK YES—NO "DID HE KNOW IT WASN'T TRUE WHEN HE TOLD YOU?" |
| DETRIMENTAL — RELIANCE | RELIANCE — BY — PLAINTIFF AND LOSS — BY — PLAINTIFF |
| RELIANCE — BY — PLAINTIFF | ASK YES—NO "DID YOU DO ANYTHING DIFFERENTLY BECAUSE OF WHAT HE TOLD YOU?" |
| LOSS — BY — PLAINTIFF | ASK YES—NO "DID YOU LOSE ANYTHING DUE TO THE MISREPRESENTATION?" |

FIG. 4

EXPERT SYSTEM WITH KNOWLEDGE BASE HAVING TERM DEFINITION HIERARCHY

CROSS-REFERENCES TO RELATED APPLICATIONS

This application is a continuation-in-part of U.S. Ser. No. 030,250, filed Mar. 24, 1987, now U.S. Pat. No. 4,916,633 which in turn is a continuation of U.S. Ser. No. 766,860, filed Aug. 16, 1985, now abandoned. The additional disclosure of the present application begins at Section 12 of the Description of a Preferred Embodiment.

BACKGROUND OF THE INVENTION

1. Field of the Invention

The present invention relates to expert systems implemented by means of digital computers and more particularly to the knowledge base and inference engine components of expert systems, to apparatus for creating expert systems, and to apparatus and methods for creating a definitional knowledge base.

2. Description of the Prior Art: FIGS. 1 and 1A

In recent years, expert systems have become commercially available. An expert system is a system which applies information in a given field of expertise in the same fashion as would an expert in the field. Additionally, expert systems resemble human experts in that they are able to some degree to explain themselves. Depending on its complexity, an expert system may explain why it reached a given conclusion, explain why it wants a given piece of information, and permit the user to change the value of a given piece of information and see how that affects the result. Expert systems have been built which perform tasks such as configuring large computer systems, diagnosing bacterial infections, or diagnosing why an oil drilling bit has become stuck and suggesting a remedy.

Prior-art expert systems have generally been rule based, i.e., they have functioned by applying rules obtained by questioning an expert about his expertise to facts provided by the user of the expert system. The rules are generally of the form If A then B In such a rule, A is termed the predicate for B, which is the conclusion. When A is true, then the conclusion may be inferred to be true. For example, one rule in a medical diagnostic system might be "If the patient has a fever and runny nose, he may have the flu." According to this rule, if the symptoms are a fever and runny nose, one possible inference is the flu.

FIG. 1 is a block diagram of a prior-art rule-based expert system 101. System 101 has three components, command processor (CP) 103, rule inference engine (RIE) 105, and rule store (RS) 107. RS 107 contains the rules 109 for the area for which the system is an expert. RIE 105 receives problem data from the user, applies the rules in RS 107 to the data, and provides the result of its application of the rules to the problem data to the user. CP 103 controls RIE 105 by means of inference engine commands (IEC). CP 103 produces the commands from command input provided by the user. To continue with the flu example above, a person using a medical diagnosis expert might input the command to the CP "What disease?" CP 103 would then provide an inference engine command to RIE 105, which would determine that its rules for diseases required symptoms. RIE 105 would then request problem data from the user, perhaps by asking "What symptoms?" The user could then input the symptoms and RIE 105 could then find a rule 109 for which the symptoms were the predicate and return the rule's conclusion as result data. For example, if the input symptoms were "fever and runny nose", expert system 101 could conclude from the rule 109 cited above that the disease might be the flu. Of course, many other ailments have those symptoms, and there would therefore be more than one rule 109 having the symptoms as part of its predicate. Depending on its sophistication, expert system 101 could simply return as results the conclusions of all rules 109 having the symptoms as part of their predicate or could ask the user for more symptoms and use the new symptoms to narrow the number of rules which would apply.

In either case, expert system 101 can, at the request of the user, show what rules 109 it used to reach its conclusion.

The first prior-art expert systems 101 were custom-made and required long and close cooperation between an expert, a knowledge engineer, and computer system designers. The expert provided his expertise; the knowledge engineer reduced the expertise to rules 109 and designed RIE 105 and the representation used to store the rules 109 in RS 107. Computer system designers, finally, wrote the programs which implemented the knowledge engineer's design.

The large inputs of professional time required to custom build expert systems 101 made them very expensive and led the makers of expert systems 101 to develop special tools, called expert system shells, for making expert systems. FIG. 1A is a block diagram of an expert system shell 110 for making rule-based experts. As may be seen from that figure, the expert system shell has the components of the rule based expert of FIG. 1 and an additional component, rule processor (RP) 111. Rule processor 111 is used to produce rules 109 for storage in a RS 107 specific to the expert system currently being built. RIE 105 is used in expert system shell 110 to test the expert system being built as it is constructed. When all of the rules 109 for the expert system being developed have been written and the system has been fully tested, users of the new expert system are given access to RIE 105 and to RS 107 for the new expert.

The usefulness of expert system shells 110 depends to a considerable extent on the sophistication of RP 111. In some systems, RP 111 requires rules 109 input in special forms. Thus, these systems generally require a knowledge engineer and cannot be used by the expert himself. In other systems, RP 111 constructs its rules from examples provided by the expert, and thus does not require a knowledge engineer.

Although rule-based expert systems 101 are becoming steadily more powerful, more usable, and less expensive, their reliance on rules has certain inherent disadvantages. First, most experts do not think about their areas of expertise in terms of a set of rules. Because they do not, a knowledge engineer or a system which constructs rules from examples must mediate between the expert and expert system shell 110. In the first case, the development of expert systems is more expensive than it would be otherwise, and in the second case, the complexity of expert system shell 110 is greater than it would be otherwise and the expert is still not completely insulated from the rules, since he must still check the rules produced by shell 110.

Second, since RS 107 is a collection of rules 109 created independently of each other, there is no guarantee that the collection of rules 109 is complete or contains no contradictory rules. If a set of rules 109 is incomplete, expert system 101 may reach no result or a wrong result; if the set of rules 109 includes contradictory rules 109, expert system 101 may again reach no result or reach a result which depends on RIE 105's internal algorithm for resolving contradictions rather than the rules.

The ability to operate with incomplete sets of rules 109 or with contradictory rules 109 is part of the power of rule-based systems 101 and is required in situations in which the expert is unable to reduce his area of expertise to clear principles. However, expert systems are employed in many situations where the expert can reduce his expertise to clear principles, and in these situations, the ability to deal with incomplete sets of rules 109 and contradictory rules 109 makes detection of mistakes more difficult, and when a mistake is made, makes the behavior of system 101 dependent upon RIE 105's internal algorithms rather than on the rules.

Third, rule-based expert systems 101 are difficult to modify. The behavior of a rule based expert system depends on the totality of its rules, and it is often difficult to determine what rules must be changed if the system's behavior is to be altered because it has bugs or because the expert has changed his mind about how he would deal with a given case.

Fourth, the power and complexity of rule based expert systems 101 are not required for many situations in which expert systems are useful. Generally speaking, that power and complexity is required where the expert cannot fully define his expertise. However, there are many situations where the layman requires the guidance of an expert but the expert can completely and easily define his expertise. In such situations, useful expert systems and expert system shells need not have the complexity inherent in rule-based expert systems and expert system shells.

One such situation is that presented by complex forms such as tax forms. In most cases, little judgment is required to fill out the form, but the form is nevertheless so involved that many people require the help of a tax preparer. Spread sheets have made it mechanically easier to deal with the data involved in filling out a tax form and permit a user to see how a change in one value affects others, but they have not provided the kind of reasoned guidance for the user which is possible in an expert system. What is needed, therefore, and what is provided by the invention described herein, is an expert system shell which is easier to use than those typical of rule based systems and expert systems which are substantially simpler than rule-based expert systems, but which provide reasoned expert advice in situations which do not require the full power of rule-based systems.

SUMMARY OF THE INVENTION

The present invention relates to digital data processing systems and more specifically to expert systems and expert system shells employed in digital data processing systems. Expert systems of the present invention employ definitions instead of rules. An expert defines his area of expertise as a set of terms with a corresponding set of hierarchical definitions. The definition for a term may include terms defined at a lower level of the hierarchy, and term independent values which do not depend on the value of a term. The decisions which the expert would reach regarding a term in the hierarchy are expressed as values of the term. The defined terms make up the knowledge base of the expert system of the present invention. The inference engine determines what decision the expert would have made regarding a given term by computing the term's value from its definition. If the definition involves other terms, the values of those terms are computed from their definitions.

In other aspects of the invention, the definition of a given term may indicate an operation to be performed when the value of the given term is obtained. One such operation is displaying information including images on a display device controlled by the expert system. Another such operation is causing another system to be operated. Another is calling a procedure. Additionally, table operators permit definition of terms as base tables and columns of base tables. Query operators permit further definition of query tables from the base tables, and table operators permit terms to be defined as single fields of tables or as the result of operations on columns of tables. Finally, the values which a non-table term may represent include "don't know" values. Operators take into account the presence of such a value when they perform an operation, and other operators have been added to detect such values.

It is thus an object of the invention to provide improved expert systems and expert system shells.

It is another object of the invention to provide an expert system having a definitional knowledge base and an inference engine which employs the definitional knowledge base to reach conclusions.

It is a further object of the invention to provide an expert system which is particularly adapted for application development.

It is an additional object of the invention to provide an expert system with improved operators.

It is a still further object of the invention to provide a system in which operators can operate when certain of the operands for an operation have "don't know" values.

Other objects and advantages of the present invention will be understood by those of ordinary skill in the art after referring to the detailed descriptions of a first prototype embodiment and of certain improvements in a second prototype embodiment and to the drawings, wherein:

BRIEF DESCRIPTION OF DRAWINGS

FIG. 4 is a diagram of the terms and descriptions used to define the term FRAUD.

Figure 1:
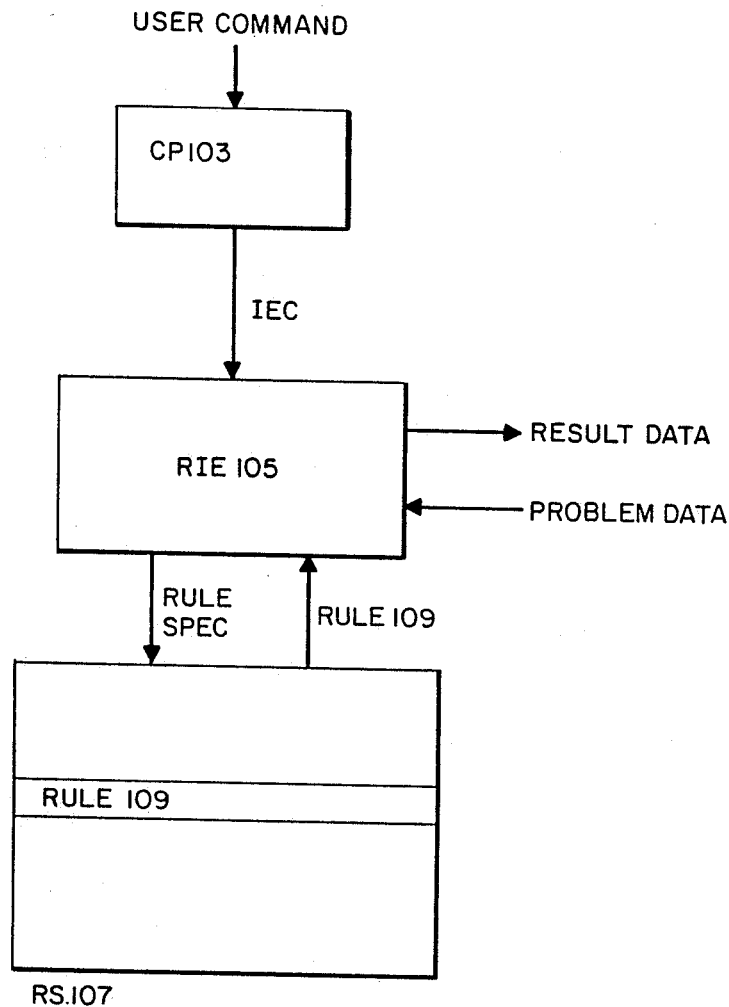
FIG. 1 is a conceptual block diagram of a prior-art expert system.
Figure 1A:
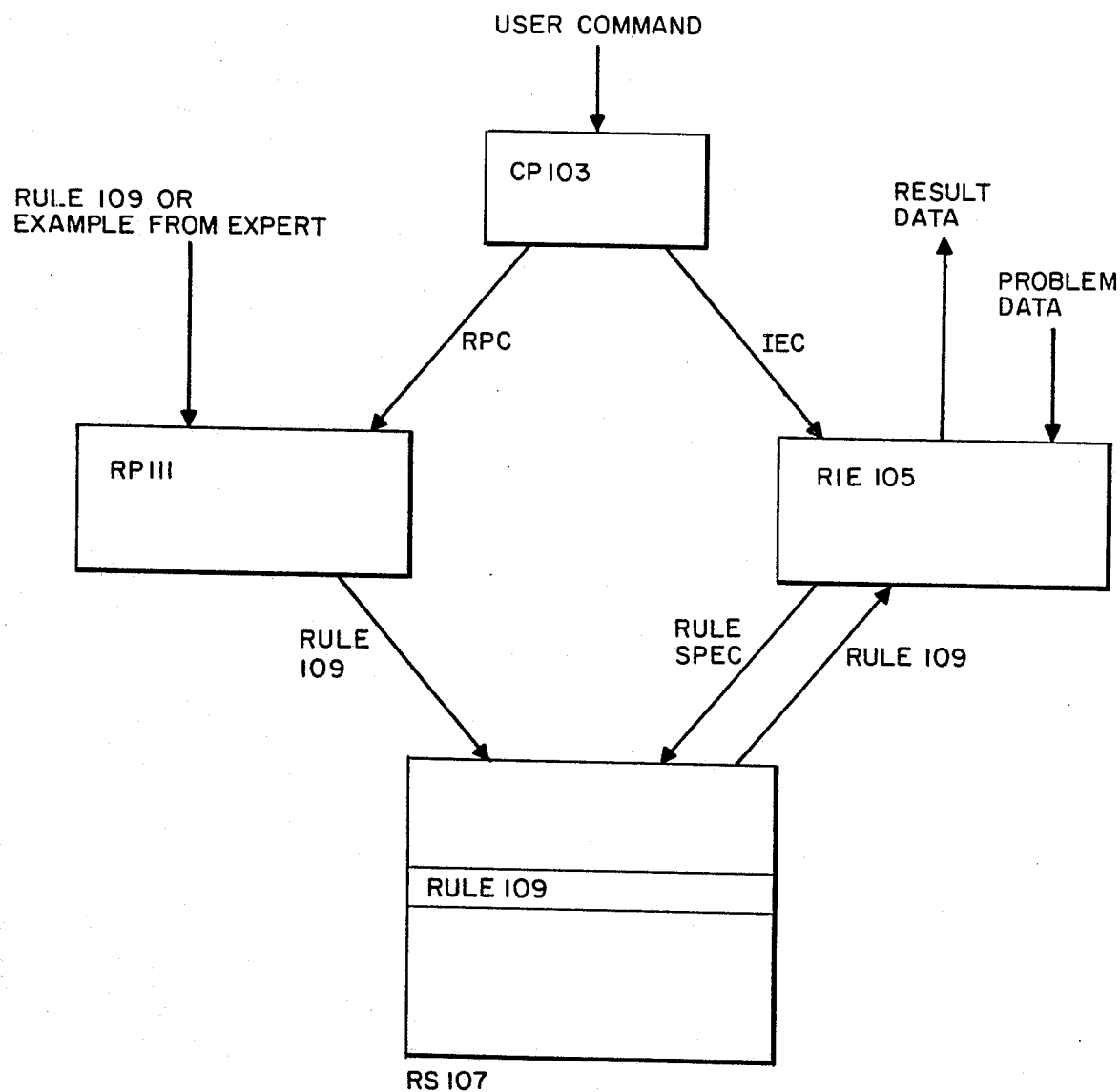
FIG. 1A is a conceptual block diagram of a prior-art expert system shell.

For ease of reference to figures, the reference numbers used in the description of the preferred embodiment have three digits. The two least-significant digits are reference numbers within a drawing; the most significant digit is the drawing number. For example, the reference number 901 refers to an item shown in FIG. 9.

DESCRIPTION OF A PREFERRED EMBODIMENT

The following description of a preferred embodiment first presents a conceptual overview of the expert system and expert system shell of the present invention and then presents a detailed description of a first prototype implementation of the invention. Certain improvements made in a second prototype implementation are discussed. Material added to this disclosure in the continuation in part begins at Section 12.

Figure 2:
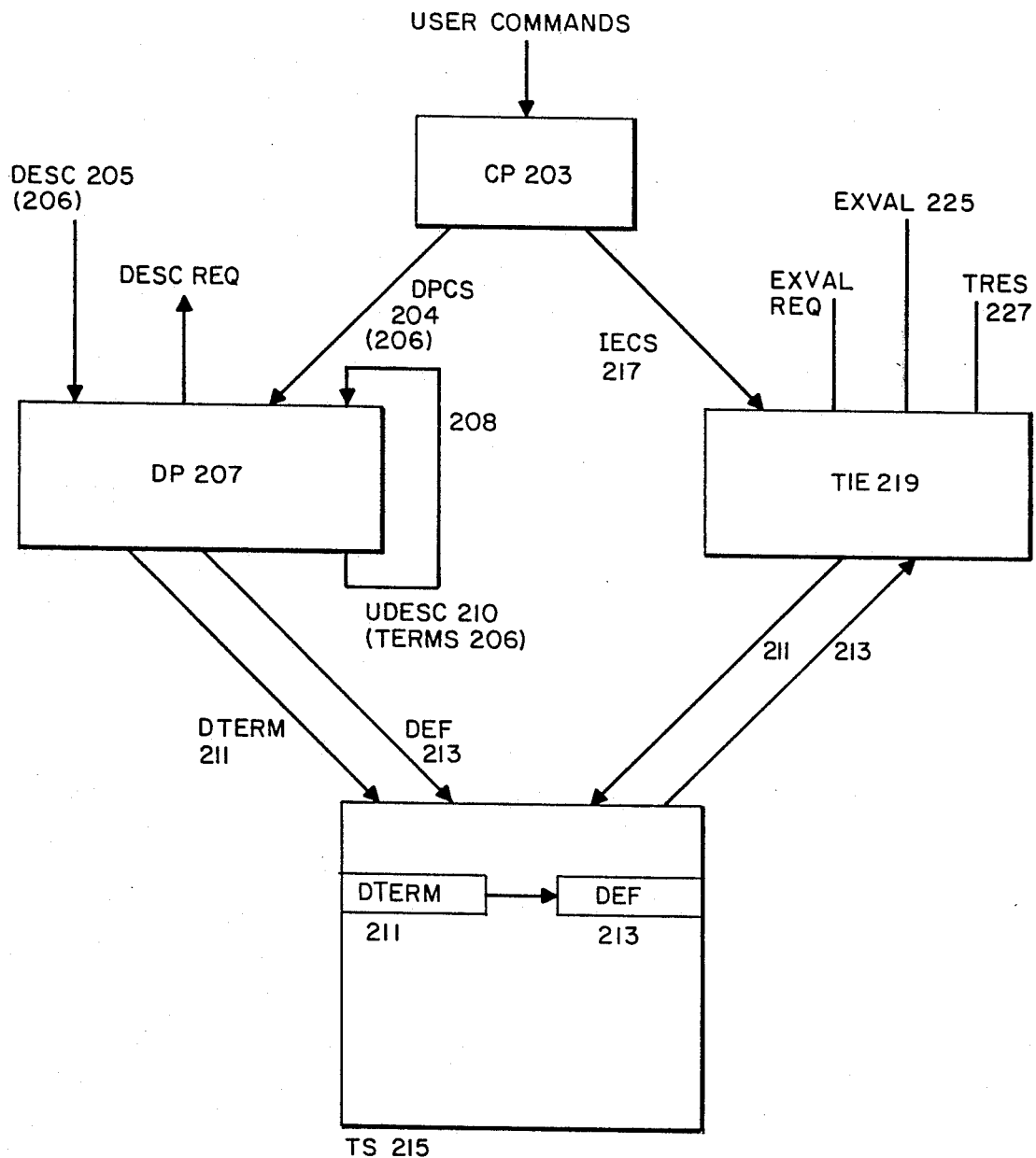
FIG. 2 is a conceptual block diagram of the expert system shell and expert system of the present invention.

1. Conceptual Overview of the Expert System Shell and Expert System of the Present Invention: FIG. 2

FIG. 2 is a conceptual block diagram of expert system shell 201 and expert system 202 of the present invention. Expert system shell 201 has four components: command processor (CP) 203, definition processor (DP) 207, term store (TS) 215, and term inference engine (TIE) 219. Expert systems 202 produced using expert system shell 201 have all of these components but DP 207. As will be explained in more detail below, CP 203 receives commands from users of shell 201 and system 202 and provides them to the other components; DP 207 processes definitions; TS 215 stores defined terms and their definitions; TIE 219 uses a term's definition from TS 215 to evaluate the term and perform other operations on it.

CP 203 converts commands from users of shell 201 and expert systems 202 into definition processor commands (DPCs) 204 and inference engine commands (IECs) 217. In the prototype, DPCs 204 permit the user of shell 201 to define a term, redefine a term, undefine a defined term, view a term's definition, save a set of definitions, and restore a set of definitions. IECs 217 permit the user of shell 201 or an expert system 202 produced by shell 201 to determine the current value of a term, find out how expert system 202 reached that value, have expert system 202 assume a different value for a term and see how that affects the value of other terms, reset the value of any one or all of the terms, and when the determination of the current value of a term requires a value to be supplied from outside the definition, to ask expert system 202 why the value is required.

Definition processor 207 defines TERMs 206. When a TERM 206 has been fully defined, TS 215 contains a defined term (DTERM) 211 corresponding to TERM 206 and a definition (DEF) 213 for DTERM 211. TERM 206 may be received either in a DPC 204 or from a description (DESC) 205 DP 207 requested from the user of expert system shell 201 in response to a TERM 206. DP 207 first determines whether there is already a DTERM 211 corresponding to TERM 206, i.e., whether TERM 206 is already defined. If it is, DP 207 retrieves DTERM 211 corresponding to TERM 206 from TS 215 and prepares it for use in the definition DP 207 is currently constructing. If it is not defined, DP 207 outputs a description request (DESC REQ) to the user of shell 201. The user provides a description (DESC) 205 of TERM 206 to DP 201, which then makes a DEF 213 for TERM 206 using the information in DESC 205. As will be described in more detail below, DESC 205 is written in a definition language which permits the user to specify other TERMs 206, constant values, and that a value is to be obtained from outside expert system 206 for which the definition is being provided. The definition further specifies operations which may be performed on the values represented by TERM 206, constants, and external values in the definition. If DESC 205 contains TERMs 206, DP 207 treats those TERMs 206 in the manner just described. If there is a DTERM 211 corresponding to TERM 206, DTERM 211 is used in DEF 213 being constructed; if there is not, DP 207 requests a DESC 205 defining TERM 206 and processes it as just described. The repetitive operation of DP 207 is shown in FIG. 2 by arrow 208 showing how UDESC 210, which contains at least one TERM 206, is again processed by DP 207. Processing continues in this fashion until the original DESC 205 and all of the TERMs 206 in any DESCs 205 produced for TERMs 206 required to define the TERMs 206 in the original DESC 205 have been defined, i.e., have corresponding DTERMs 211 and DEFs 213 in TS 215.

The DTERMs 211 and DEFs 213 resulting from operation of DP 207 are placed in TS 215. DTERM 211 may be located in TS 215 by name. DEF 213 corresponding to DTERM 211 is associated with DTERM 211, and may thus be used once DTERM 211 is located. Included in DEF 213 is a modified version of DESC 205 from which DEF 213 is derived.

The remaining operations specified by DPCs 204 are carried out in DP 207 and TS 215 as follows: when a TERM 206 is undefined, DP 207 removes the corresponding DTERM 211 and DEF 213 from TS 215; when a TERM 206 is redefined, DP 207 removes DEF 213 corresponding to TERM 206 and requests a new DESC 205 for TERM 206. That DESC 205 is then processed in the manner just described. When a DPC requests that a TERM 206's definition be displayed, DP 207 displays the DESC 205 which was incorporated into the DEF 213 for DTERM 211 corresponding to TERM 206. Finally, the save operation saves the contents of a given TS 215 to a file for later use and the restore operation restores the contents of the file to TS 215.

Term inference engine (TIE) 219 performs operations using the DTERMs 211 and DEFs 213 in TS 215. The primary operation is the what operation, which determines the value of a DTERM 211 from its definition and external values provided by the user of expert system 202 or shell 201. TIE 219 performs the what operation in response to an IEC 217 specifying the operation and a TERM 206 from CP 203. TIE 219 uses DTERM 211 corresponding to TERM 206 to locate DTERM 211's DEF 213 in TS 215. It then performs the operations specified in DEF 213 using the DTERMs 211, constants, and external values specified in the definition and return the result, TRES 227, to the user of system 202 or shell 201.

The constants in DEF 213 are available for immediate use in calculating the value of DTERM 211; in the case of the external values, DTERM 211 contains a description of how the external value is to be obtained. TIE 219 uses the description to make a request for an external value (EXVAL REQ) to the source of the external value (EXVAL) 225 and receives EXVAL 225 from the source. In the simplest case, the source is the terminal being used by the user of system 202 or shell 201 and the information is obtained by putting a question on the user's terminal screen and receiving his input; in more complex cases, the source may be a file or a data base.

In the case of a further DTERM 211 in DEF 213 for the DTERM 211 being evaluated, TIE 219 obtains the further DTERM 211's DEF 213 and computes that DTERM 211's value from its DEF 213, evaluating as it does so any DTERMs 211 in that DEF 213, and continuing thus until all DTERMs 211 from which the DTERM 211 whose value is being sought in the what operation is dependent have been evaluated. The constants, external values, and DTERMs 211 specified in each DEF 213 are dealt with in the manner just described. When all DEFs 213 have been evaluated, the value of DTERM 211 whose value is being sought is computed and returned as TRES 227.

In a preferred embodiment, EXVALs 225 which are obtained during evaluation of a given DEF 213 become part of that DEF 213's definition; thus, if the what operation is performed a second time on DTERM 211, TIE 219 will not produce any EXVAL REQs, but will simply use the stored EXVALs 225 to recompute the value of DTERM 211. A preferred embodiment has two IECs 217 for modifying the stored EXVALs 225. The first, reset, simply removes all of the stored EXVALs 225 from the DEFs 213 for the DTERMs 211 specified in the reset command. Thus, when what is again performed, a new EXVAL 225 will be obtained as previously explained. The second, assume, permits a new EXVAL 225 to be provided to DEF 213 for TERM 206 specified in the assume command. When what is again performed in this case, the specified EXVAL 225 is used to derive the value of DTERM 211 for which the what operation is being performed.

If a user of shell 201 or system 202 wants to know why TIE 219 is asking for a given EXVAL 225, he can respond to an EXVAL REQ with the command for the why operation. In response to that command, TIE 219 outputs DESC 205 from DEF 213 for the DTERM 211 whose value was being computed when the EXVAL 225 was required, and the user can determine from DESC 205 why the given EXVAL 225 is important. The user can further use why to ask why any of the DTERMs 211 whose values are required to obtain the value of the DTERM 211 whose evaluation produced the EXVAL REQ are required, and TIE 219 provides the DESCs 205 for those DTERMs 211.

Figure 3:
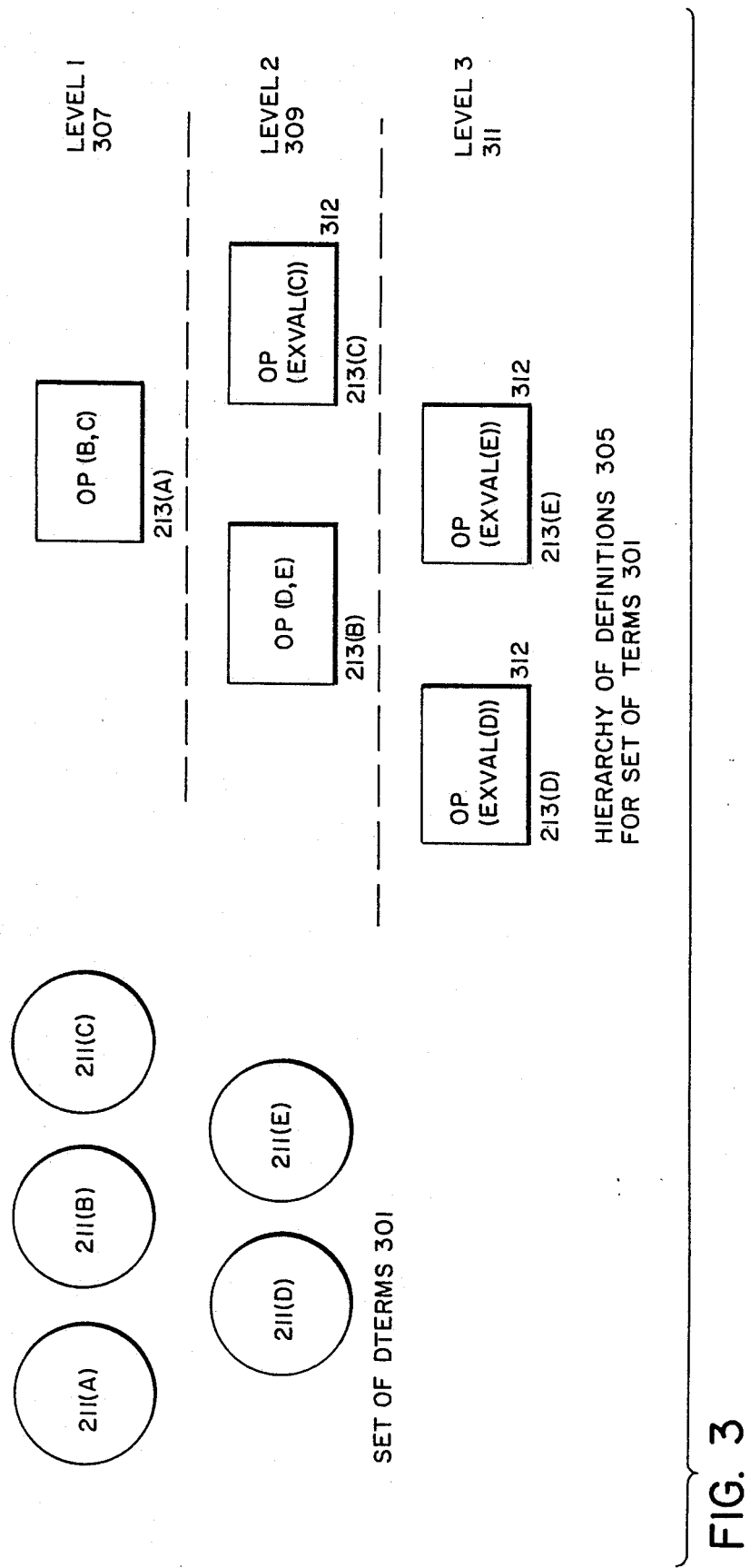
FIG. 3 is a conceptual diagram of a hierarchy of definitions as used in the present invention.

2. The Hierarchy of Definitions: FIG. 3

In defining any term, DP 207 produces a hierarchy of DEFs 213. If DEF 213 for the term being defined itself contains no terms, the hierarchy has only one level. If DEF 213 for the term contains a further term, that term must be defined before the first term can be defined, and the first term is the top term in a hierarchy with two levels. If any of the DEFs 213 at the second level contains a further term, that term must be defined, and the hierarchy has three levels. The hierarchy thus continues to deepen until none of the DEFs 210 for the terms upon which other terms depend contains a further term, but is instead defined solely in terms of operations on constants or external values. As is clear from the above discussion, a DEF 213 is always the top DEF 213 in the hierarchy of DEFs 213 required to define the DTERM 211 which DEF 213 defines, but may at the same time be at a lower level in the hierarchy of DEFs 213 required to define some other DTERM 211.

FIG. 3 is a conceptual illustration of one such hierarchy of DEFs 213. Hierarchy 305 contains DEFs 213(A) through 213(E) corresponding to DTERMS 211(A) through 211(E) belonging to set of DTERMS 301. The topmost definition in hierarchy 305 is DEF 213(A), corresponding to DTERM 211(A). The notation OP(B,C) in DEF 213(A) indicates that DEF 213(A) specifies that the value of DTERM 211(A) is obtained by performing an operation on the values of DTERMs 211 (B) and (C). Similarly, DEF 213 B specifies that the value of DTERM 211(B) is obtained by performing an operation on the values of DTERMs 211(D) and (E). Consequently, hierarchy 305 for DEF 213(A) has three levels: level 1 307, containing only DEF 213(A), level 2 309, containing DEF 213(B) and DEF 213(C), and level 3 311, containing DEFs 213(D) and 213(E). DEFs 213(C), 213(D), and 213(E) do not define DTERMs 211 C, D, and E with other DTERMs 211, and cannot give rise to lower levels. Such DEFs 213 are termed terminal definitions 312.

In constructing hierarchy 305, DP 207 begins with TERM 206(A) corresponding to DTERM 211(A), which it receives from a DESC 205 from which a DEF 213 at a higher level is being constructed or from a define or redefine DPC 204. DP 207 then requests a DESC 205 for DTERM 211(A). DESC 205 defines DTERM 211(A) in terms of an operation on two TERMS 206, B and C. If DEF 213(B) and DEF 213(C) already exist, DP 207 can make DEF 213(A) and need go no further. If either DEF 213(B) or DEF 213(C) does not exist, DP 207 must produce those DEFs 213 before it can make DEF 213A. DP 207 thus asks for a DESC 205 for TERM 206(B) and for TERM 206(C). In the case of TERM 206(C), DESC 205 defines TERM 206(C) only in terms of EXVAL(C) 225, and DEF 213(C) can be constructed immediately. In the case of TERM 206(B), DESC 205 defines TERM 206(B) in terms of two additional TERMs 206, D and E; consequently, DP 207 must descend another level and produce DEFs 213 for those TERMs 206. Again, DP 207 requests DESCs 206 for those terms. In both cases, the TERMs 206 are defined in terms of EXVALs 225, and consequently, both DEFs 213 can be constructed. DEFs 213 for all TERMs 206 involved in the definition of TERM 206 A have now been constructed, DTERMs 211(B) through (E) corresponding to TERMs 206 (B) through (E) exist, DEF 213(A) can be constructed, and TERM 206(A) now has a DTERM 211(A) corresponding to it.

Because hierarchy 305 is constructed repetitively beginning with the top DEF 213 in hierarchy 305 and only TERMs 206 which have no corresponding DTERM 211 are defined, no DTERM 211 can have two DEFs 213 and no DEF 213 in hierarchy 305 can refer to a DEF 213 which is above it in hierarchy 305. Consequently, the DEFs 213 in hierarchy 305 are necessarily complete and consistent with regard to DEF 213(A) in hierarchy 305 or to the top DEF 213 in any hierarchy incorporating DEF 213(A).

3. The Description Language for Descriptions 205

As previously indicated, DP 207 makes DEFs 213 from descriptions (DESCs) 205. In the prototype, DESCs 205 are made using a description language. The description language includes predefined terms specifying operations on terms, a case statement, and operations for obtaining external values.

The operations include Boolean operations, arithmetic operations, and text concatenation. The case statement is a list of boolean expression-value pairs of the form:

(boolean_exp_1) value$_1$_1 ... (boolean_exp_n) value _n (OTHERWISE) otherwise_value When DEF 213 containing a case statement is evaluated, the boolean experessions 1 through n are evaluated in order until one of them is true. The value corresponding to the true boolean expression becomes the value of DTERM 211 defined by DEF 213. If none of the boolean expressions is true, the value corresponding to OTHERWISE becomes the value of DTERM 211.

The description language of the prototype permits specification of two classes of operations for obtaining external values. The first class, the ASK operations, obtains values from the terminal of the user of expert system 202. The first class, the ASK operations, are used to obtain external values from the terminal. The second class, the RECORD operations, are used to obtain external values from a data base system. In both cases, the external values may be numbers, text strings, or boolean values, or they may select one of a set of alternative literal terms, i.e., terms which represent nothing but themselves.

ASK to obtain a numeric value has the form:

ASK NUMBER "prompt_string"

When the DEF 213 containing such an ASK operation is evaluated, DP 207 outputs the prompt string to the terminal and waits for a number input from the terminal. That number is then used in the evaluation of DEF 213. The prompt string may itself contain a previously-defined term, and consequently, a user's response may be made to depend on the value of a previously-evaluated term. The ASK operations for boolean and text string values are specified in the same fashion as the ASK operation for numeric values, except that NUMBER in the above operation is replaced by YES-NO when a boolean value is sought and TEXT when a text string is sought.

ASK which selects one of a number of literal terms has the form:

ASK CHOICE "prompt_string"

(literal_term_1 ... literal_term_n)

When the DEF 213 containing ASK CHOICE is evaluated, the prompt string is output and the user is asked to select one of the literal terms. That literal term may then be used in DEF 213 to compute the value of DTERM 211 defined by DEF 213.

The RECORD operations are generally analogous to the ASK operations, except that the RECORD operation specifies how the external value is to be located in the data base and the data base supplies the value at the specified location.

4. Operation of Shell 201 and System 202: FIG. 4

The operation of shell 201 will be explained in detail using a hierarchy of definitions from which it may be determined whether someone has been defrauded. The legal definition of fraud requires that one party knowingly made a misrepresentation to the other party and that the other party relied on the misrepresentation to his detriment. FIG. 4 shows a hierarchy of DTERMs 211 which corresponds to that legal definition.

Creation of the hierarchy of FIG. 4 begins when CP 203 receives the DEFINE FRAUD command. CP 203 then passes TERM 206 FRAUD to DP 207, which requests a DESC 206 from the expert making the definition. The expert provides the DESC 206

KNOWING_MISREPRESENTATION AND DETRIMENTAL_RELIANCE

This DESC 206 contains two further TERMs 206 and the boolean AND operator. Thus, the value of FRAUD is to be computed by obtaining the values of the DTERMs 211 corresponding to the TERMs 206 and performing an AND operation on them.

Since the further TERMS 206 are undefined, DP 207 asks for their definitions. The expert provides the DESC 205

MISREPRESENTATION AND DEFENDANT_KNEW_MISREPRESENTATION for KNOWING_MISREPRESENTATION and the DESC 205 RELIANCE_BY_PLAINTIFF AND LOSS_BY_PLAINTIFF for DETRIMENTAL_RELIANCE. Again, these further TERMs 206 are undefined, so DP 207 asks for their definitions and the expert provides the definitions shown in FIG. 4. While DP 207 may ask for definitions in any order, a preferred embodiment defines all TERMs 206 necessary to define a given undefined TERM 206 before going on to the next undefined TERM 206.

In the above example, the DESCs 205 for MISREPRESENTATION, DEFENDANT_KNEW_MISREPRESENTATION, RELIANCE$_{13}$ BY_PLAINTIFF, and LOSS_$_{BY}$_PLAINTIFF all contain only the system defined DTERMs 211 used in the ASK YES-NO operation, so DP 207 is now able to produce DEFs 213 for all of the terms in the hierarchy. The values of all of the DTERMs 211 in the hierarchy depend ultimately on the values which the ASK YES-NO operation requests from the user of expert system 202 which employs the FRAUD definition, and thus depends ultimately on what the plaintiff says about what happened to him.

Use of the FRAUD definition hierarchy in expert system 202 begins with the WHAT FRAUD command which the user of expert system 202 inputs to CP 203. CP 203 generates a corresponding WHAT FRAUD IEC 217 for TIE 219. TIE 219 then determines the value of FRAUD by evaluating its DEF 213. In order to do that, it must evaluate the DEFs 213 for other DTERMs 211 in the hierarchy, beginning with KNOWING_MISREPRESENTATION. The evaluation of KNOWING_MISREPRESENTATION requires the evaluation of MISREPRESENTATION. The evaluation of that DTERM 211 results in the execution of the WHAT YES-NO operation in its DEF 213, and TIE 219 outputs the prompt "Did he tell you anything that wasn't true?" If the user answers "no", MISREPRESENTATION is false, KNOWING_MISREPRESENTATION is false, and FRAUD is false, so TIE 219 returns TRES 227 to the user indicating that there is no fraud. If the user answers "yes", TIE 219 evaluates DEFENDANT_KNEW_MISREPRESENTATION, which again results in a question to the user. Depending on the answer to the question, evaluation continues or is finished. TIE 219 proceeds in the above fashion until it has computed a value for FRAUD.

As previously mentioned, a user of expert system 202 may use the HOW user command to determine how expert system 202 arrived at its value for FRAUD. Assuming that the user answered "no" when asked "Did he tell you anything that wasn't true" (in the definition of MISREPRESENTATION), TIE 219 in the prototype will respond to HOW FRAUD by outputting FRAUD is defined to be (KNOWING_MISREPRESENTATION AND DETRIMENTAL_RELIANCE) where (KNOWING_
MISREPRESENTATION) equals FALSE.

As previously mentioned, DP 207 places DESC 205 for a DTERM 211 in the DTERM 211's DEF 213, and TIE 219 also stores the external values it receives in evaluating a DTERM 211's DEF 213 in DEF 213. In performing the HOW operation, TIE 219 first fetches and outputs DESC 205 from DEF 213 for the DTERM 211 being inquired about and then evaluates the DTERMS 211 in DEF 213 as required to obtain the value of DTERM 211 being inquired about. The DTERMs 211 are then output together with their values. If a user wishes to inquire further, he need only repeat the HOW operation on the other DTERMS 211 specified in the DESC 205 output in the HOW operation.

As also previously mentioned, a user may respond to a request for an external value with the WHY command instead of a value. If a user responds in the case of the FRAUD example with WHY when TIE 219 asks "Did he tell you anything that wasn't true", TIE 219 responds with:

MISREPRESENTATION is needed to determine the value of KNOWING_MISREPRESENTATION, which is defined to be MISREPRESENTATION AND SUBJECT_KNEW_MISREPRESENTATION and repeats the question.

Again, the information used to respond to the WHY command comes from the DESCs 205 stored in the DEFs 213 in the hierarchy used to define FRAUD. If the user wants to know more at this point, he can apply HOW to the DTERMs 211 mentioned in the response to the WHY command.

Figure 5:
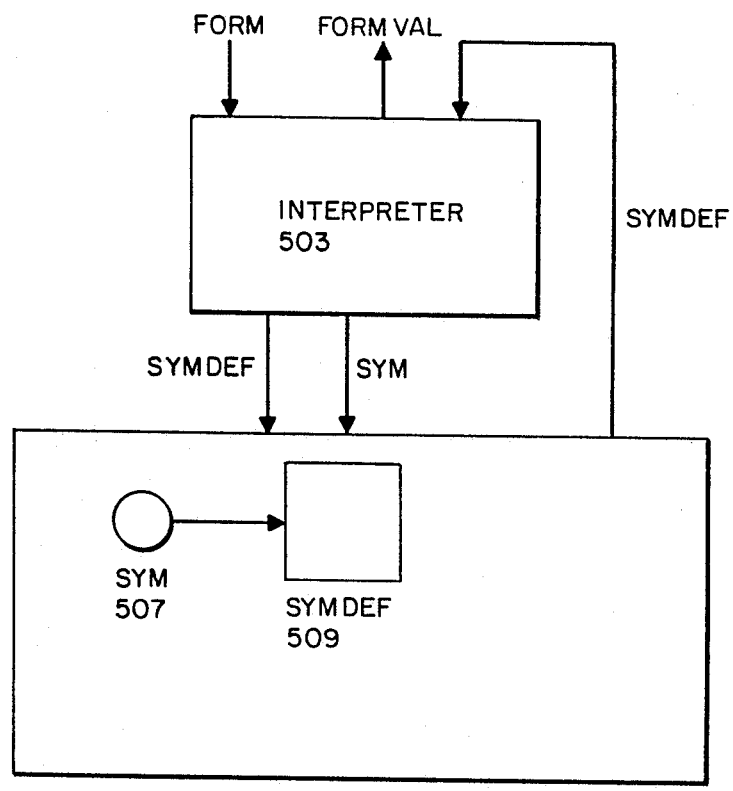
FIG. 5 is a diagram of a LISP environment.

5. The LISP Environment of the Prototype Embodiments: FIG. 5

Having thus provided a conceptual overview of the structure and operation of shell 201 and system 202, the discussion proceeds to a detailed description of the implementation of the first prototype.

Both the first and second prototype embodiments are implemented in the LISP programming language and execute in the LISP environment. The LISP programming language and environment are frequently used to implement prototype and production expert systems and are well-known in the expert system art. The specific LISP dialect used for the prototype embodiments is COMMON LISP, which is described in Guy L. Steele, Jr., *COMMON LISP, the Language*, Digital Press, 1984. Only so much of the LISP environment and language are described here as is required for a clear understanding of the mode of operation of the prototype embodiments.

Beginning with the LISP language, the language differs from languages such as FORTRAN or PASCAL in that is is chiefly concerned with the processing of symbols, as opposed to the processing of data which is represented in a program by symbols. The fundamental components of a LISP program are atoms. An atom may be a symbol, such as ABC, or a constant. The components are organized into programs by means of lists which may have no members or members including atoms and other lists. A list is made by enclosing its members in parentheses: (ABC) is a list with one member, the symbol ABC. Functions appear in LISP as lists in which the first symbol in the list represents the function and the other atoms represent the function's arguments. For example, the add function is represented in LISP by the symbol +, and the list (+2 3) specifies that the +operation is to be applied to the atoms 2 and 3. Any atom or list which has a value when evaluated by a LISP interpreter is called a form. 5 and (+2 3) are forms, and if the symbol ABC has a value, it is a form.

Functions are defined in LISP by means of the DEFUN function, in which the remaining items of the list define the function's name, its arguments, and the value it returns. For example, (defun five () 5) defines a function which takes no arguments and always returns the value 5.

Among the things LISP programs can do with symbols and lists is make them. Since a function definition is only a kind of list, a LISP program can provide a symbol to DEFUN as the name of the new symbol being created by DEFUN and then use the symbol to execute the newly-created function. Symbols may either represent themselves as symbols or values. When a symbol is representing itself as a symbol in a LISP list, it is preceded by a ' mark. In the case of symbols representing functions, the value of the symbol is the function. However, if the function is placed in a list with its arguments and the list evaluated, the result is the value of that execution of the function. Thus, —five represents the symbol five, while five represents the function defined by DEFUN above, and (five) represents the value of an execution of the function five, i.e., 5.

LISP programs are written and executed in a LISP environment. That used for the prototype embodiments was made by Gold Hill Computers, Inc. for the Professional Computer manufactured by Wang Laboratories, Inc. FIG. 5 is a conceptual block diagram of a typical LISP environment 501. Environment 501 has two main components, LISP interpreter 503, which evaluates LISP forms, and LISP symbol space 505, which stores LISP symbols (SYM 501) and their definitions (SYMDEF 509). DEFUN and certain other LISP functions create and define new LISP symbols or redefine previously-existing LISP symbols when they are evaluated; consequently, LISP interpreter 503 may be seen as not only an evaluator of symbols, but also as a creator, definer, and redefiner of symbols.

Operation of LISP environment 501 is as follows: when a user of LISP environment 501 types a list containing a form such as (five), LISP interpreter 503 evaluates the form by locating the symbol five in symbol space 505, determining what its SYMDEF 509 is, and then interpreting SYMDEF 509 to compute the value of five. In this case, SYMDEF 509 is the code for the function five which was created by evaluation of the DEFUN expression, and its interpretation produces the value 5, which the interpreter returns to the user as the value of (five).

Because LISP interpreter 503 is able to create SYMs 507 and their corresponding SYMDEFs 509, store them in symbol space 505, and locate them in symbol space 505, LISP environment 501 automatically performs operations which are difficult to implement in other languages and which are essential for the operation of expert system shells and expert systems. For that reason, LISP environments 501 have been the preferred environments for the creation of prototype expert systems and expert system shells. As will be seen in the ensuing discussion, the prototypes of the present invention take full advantage of the symbol creation, definition, and location operations.

Figure 6:
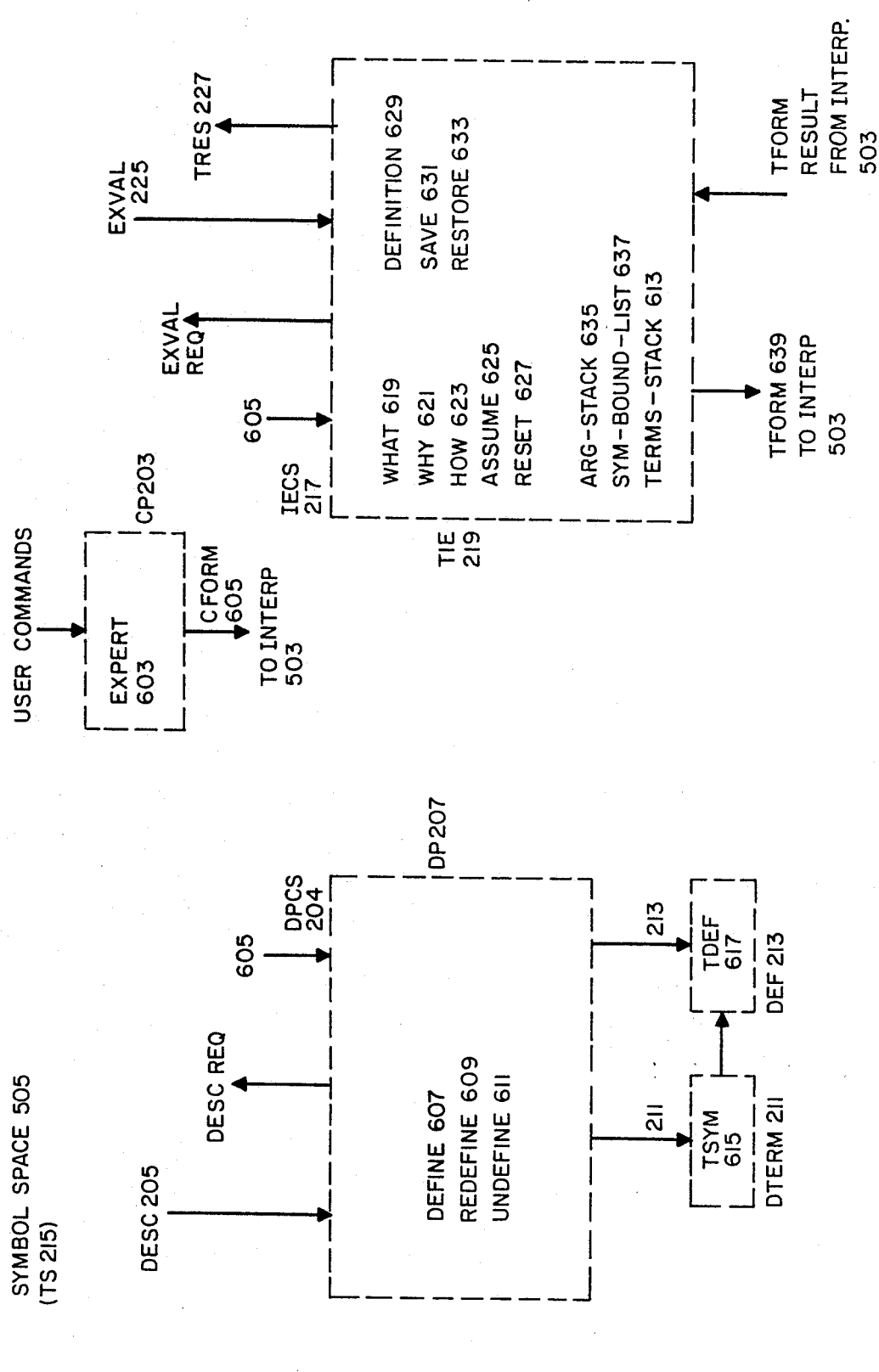
FIG. 6 is an overview of a first prototype embodiment of the present invention.

6. Overview of the First Prototype Embodiment: FIG. 6

In the first prototype embodiment, the components of expert shell 201 and expert system 202 are implemented by means of LISP functions. FIG. 6 gives an overview of the functions and relates them to the components of FIG. 2 and the inputs and outputs of those components. Thus, the LISP functions making up CP 203 are contained in the dashed box with that label, the functions making up DP 207 are in the dashed box with that label, and those making up TIE 219 are in the dashed box with that label. TS 215 is embodied in the first prototype by LISP symbol space 505, which stores LISP symbols and their definitions. The components of the first prototype embodiment should also be understood to include LISP interpreter 503, which executes the LISP functions making up the components, places the SYMs 507 and SYMDEFs 509 created by the components in symbol space 505, and manipulates the SYMs 507 and their SYMDEFs 509.

Beginning with EXPERT 603, EXPERT 603 performs the functions of CP 203 in the prototype. EXPERT 603 receives an input string, puts parentheses around it to produce a LISP form termed CFORM 605 in FIG. 6, and performs the EVAL operation on it. When LISP interpreter 503 evaluates the form, it treats the first symbol in the form as a LISP function name and the remaining items in the form as a list of arguments for the named function.

Expected input strings for EXPERT 603 are the commands for DP 207, namely DEFINE, REDEFINE, UNDEFINE, and the commands for TIE 219, namely WHAT, HOW, ASSUME, RESET, DEFINITION, SAVE, WHY, and RESTORE. DEFINE, REDEFINE, and UNDEFINE correspond to the DPCs 204 of FIG. 2 and the remaining strings correspond to the IECs 217 of that figure. In the first prototype embodiment, there is no error detection in EXPERT 603; however, in a commercial embodiment, EXPERT 603 would include code for detecting and responding to improper input.

As may be seen from FIG. 6, DP 207 is embodied in the first prototype by the LISP functions DEFINE, REDEFINE, and UNDEFINE. When EXPERT 603 receives the DEFINE command with a TERM 206 such as FRAUD, and presents it to the LISP interpreter as (DEFINE FRAUD), LISP interpreter 503 invokes the function DEFINE with the argument FRAUD. DEFINE requests a DESC 205 from the user and uses DESC 205 to produce the DEF 213 for FRAUD. As will be explained in greater detail below, the result of the invocation is a LISP function named FRAUD for which the DEFUN would look like the following:

```
(defun FRAUD ( )
    (prog2
        (push 'FRAUD arg-stack)
        (AND (KNOWING_MISREPRESENTATION)
            (DETRIMENTAL_RELIANCE))
        (pop Arg-stack)
))))
```

In the course of defining FRAUD, KNOWING_MISREPRESENTATION and DETRIMENTAL_RELIANCE and the DTERMs 211 required for their definitions are all defined as LISP symbols representing LISP functions. AND is a predefined LISP function which performs the AND operation on its arguments. The value returned by the function FRAUD is the result of the AND operation.

Figure 7:
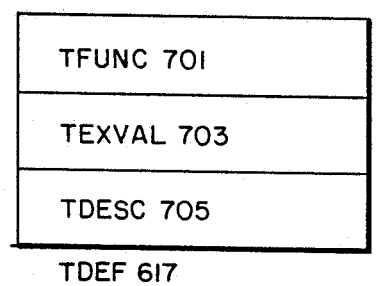
FIG. 7 is a diagram of TDEF 617 of the first prototype embodiment.

The DTERMs 211 which have been defined as LISP symbols representing LISP functions are termed TSYMs 615 in the following discussion, and their definitions, which are the prototype's implementation of DEFs 213, ar termed TDEFs 617. As the LISP interpreter produces TSYMs 615 and TDEFs 617 in response to the DEFINE function, it places them in symbol space 505. TDEF 617 in the first prototype is shown in FIG. 7. As shown there, each TDEF 617 contains TFUNC 701, the LISP function represented by TSYM 615, TDESC 705, a modified copy of DESC 205 which was the source of TSYM 615's definition, and TEXVAL 703, which contains the last EXVAL 703 specified by a user of expert 202 for TSYM 615.

The remaining functions in DP 207 are invoked in the same fashion as DEFINE from EXPERT 603. REDEFINE first employs LISP operations which remove TFUNC 701 and TDESC 705 from TDEF 617 for TSYM 615 being redefined and then invokes DEFINE to make new values for TFUNC 701 and TDESC 705 in TDEF 617. UNDEFINE simply removes TFUNC 701 and TDESC 705 without making a new definition of TSYM 615.

Continuing with the implementation of TIE 219 in first prototype embodiment 601, when LISP interpreter 503 receives a CFORM 605 from EXPERT 603 which represents an IEC 217, it executes the function in TIE 219 specified in CFORM 605. As the functions in TIE 219 are executed, they provide forms (TFORMS 639) made from TSYMS 615 to Interpreter 505, which evaluates them and returns the results (TFORM RESULT) to the function being executed.

The functions in TIE 219 employ data structures in TIE 219, ARG-STACK 635, TERMS STACK 613, and SYM BOUND LIST. Beginning with ARG STACK 635, ARG STACK 635 is used to store a TSYM 615 while the values of the TSYMs 615 with which it is defined are computed. As may be seen in the code for the procedure FRAUD above, the symbol FRAUD is pushed to ARG STACK before the AND operation which defines FRAUD is executed and is popped from ARG-STACK thereafter. TERMS STACK 613 is a stack of TSYMs 615. The stack is ordered by when a TSYM 615 s TDEF 617 was created, with the first TSYM 615 to have its TDEF 617 created at the bottom and the last at the top. As will be explained in detail below, the last TSYM 615 is normally the one whose TDEF 617 is at the top of the hierarchy of definitions. SYM_BOUND_LIST 637 is a list of TSYMs 615 which currently have EXVALs 225 assigned to them.

Beginning the discussion of the LISP functions in TIE 219 with WHAT function 619, that function is executed in response to the WHAT command to EXPERT 603. That command has the form WHAT DTERM 611. For FRAUD, it would be WHAT FRAUD, which EXPERT 603 turns into (WHAT FRAUD). WHAT function 619 first uses a LISP function to determine whether its argument is a TSYM 615, and if it is, uses another LISP function which takes a symbol which is a function name as an argument and invokes the function, in this case, FRAUD. The result is the execution of TFUNC 701 in TDEF 617 for FRAUD. When that TFUNC 701 is executed, the TFUNCs 701 for MISREPRESENTATION and DETRIMENTAL_RELIANCE are executed until the value of FRAUD has been determined. When a TFUNC 701 for a given TSYM 615 is executed, the TFUNCs 701 for any TSYMs 615 required to find the value of the given TSYM 615 are executed. When all of the necessary TFUNCs 701 have been executed, the value resulting from those executions is returned to the user of system 202 as TRES 227. If a TSYM 615 whose TFUNC 701 requires an EXVAL 225 already has such a value, the TSYM 615 is on SYM-BOUND LIST 637 and TFUNC 701 uses TEXVAL 703 in TDEF 617 for TSYM 615; otherwise, TFUNC 701 generates an EXVAL REQ and obtains EXVAL 225 from the user. Thus, the WHAT function, together with LISP interpreter 503, operate as an inference engine for determining the value of the TSYM 615 whose definition is at the top level of the hierarchy as determined by external values. Further, as long as a TFUNC 701 invoked as a consequence of the WHAT operation is active, its corresponding TSYM 615 is on ARG-STACK 635.

HOW function 623 is executed in response to the HOW command, which specifies a TSYM 615. HOW function 623 takes that TSYM 615 as an argument and uses another LISP function, SYMBOL-FUNCTION with the argument TSYM 615 to obtain the list used with DEFUN to define TFUNC 701 corresponding to TSYM 615 and other LISP functions to obtain the third element in the third list in TFUNC 701. As may be seen from the FRAUD function above, that element is the list defining the operation by which the function's value is derived, i.e., in FRAUD, the list (AND (KNOWING_MISREPRESENTATION) (DETRIMENTAL_RELIANCE)). The HOW function retrieves that list, uses TIE 219's DEFINITION function to display TDESC 705 for TSYM 615 used in the HOW command, and then evaluates the TSYMs 615 in the list retrieved from TFUNC 701, and outputs the results with suitable explanatory text.

The user of expert 202 may input the WHY command either to EXPERT 603 or to TIE 219 in response to an EXVAL REQ output during evaluation of a TSYM 615. The WHY function may be invoked either with or without a TSYM 615 as an argument. In the first case, the function works with the TSYM 615 currently at the top of ARG-STACK 635, which is the TSYM 615 corresponding to TFUNC 701 currently being evaluated and whose evaluation produced the EXVAL REQ to which the user may be responding, and in the second case, it works with TSYM 615 provided by the user. In either case, the next step is to locate the preceding TSYM 615 in ARG-STACK 635, which is the TSYM 615 corresponding to the TFUNC 701 whose evaluation led to the evaluation of the function corresponding to TSYM 615 being processed by WHY. If there is no preceding TSYM 615, the WHY command is meaningless, and a corresponding message is output to the user; if there is a preceding TSYM 615, then DEFINITION is used to output the definition for the preceding TSYM 615 together with suitable explanatory text.

Continuing with the DEFINITION function, the command to EXPERT 603 which invokes the function may have either a TSYM 615 as an argument or no argument. In the first case, TDESC 705 in TDEF 617 is output; in the second case, the TDESCs 705 for all TSYMs 615 on TERMS-STACK 613 are output.

The ASSUME function is invoked with the ASSUME command, which specifies a TSYM 615 and a value. The TSYM 615 must be one whose TFUNC 701 requests an EXVAL 225. ASSUME first empties ARG-STACK 635, so that the TSYM 615 will be reevaluated before a WHY command succeeds, then sets TEXVAL 703 in TDEF 617 to the value received as an argument, and puts TSYM 615 on SYM BOUND LIST 613 to indicate that it has a TEXVAL 703.

The RESET function is invoked with the RESET command, which may or may not specify a TSYM 615. In the first case, only TEXVAL 703 in TDEF 617 corresponding to TSYM 615 is reset; in the second case, all TEXVALs 703 are reset. The RESET function first empties ARG-STACK 635 for the reasons previously described. If a TSYM 615 is specified, the RESET function unbinds TEXVAL 703 from TSYM 615, effectively removing it from TDEF 617, and removes TSYM 615 from SYM BOUND LIST 637. If no TSYM 615 is specified, RESET performs the above operation for every TSYM 615 on SYM BOUND LIST 637.

The SAVE function makes a file which contains a DEFINE command for each TSYM 615 followed by TDESC 705 for the TSYM 615. The DEFINE commands occur in the order in which TSYMs 615 occur in TERMS-STACK 613. SAVE works by outputting the following to the file for each TSYM 615 in TERMS-STACK 613: the string DEFINE, a string representing TSYM 615, and a string representing TDESC 705 for TSYM 615. The resulting file contains the TDESCs 705 in the order in which the DESCs 205 upon which they are based were input to DP 207.

The RESTORE function restores the TSYMS 615 which were previously saved. It does so by performing a LISP load operation on the file. In the load operation, the LISP symbols in the file are evaluated. In this case, the result of the evaluation is the production of the TSYMs 615 and their TDEFs 617 specified in the DEFINE commands in the resored file.

Figure 8:
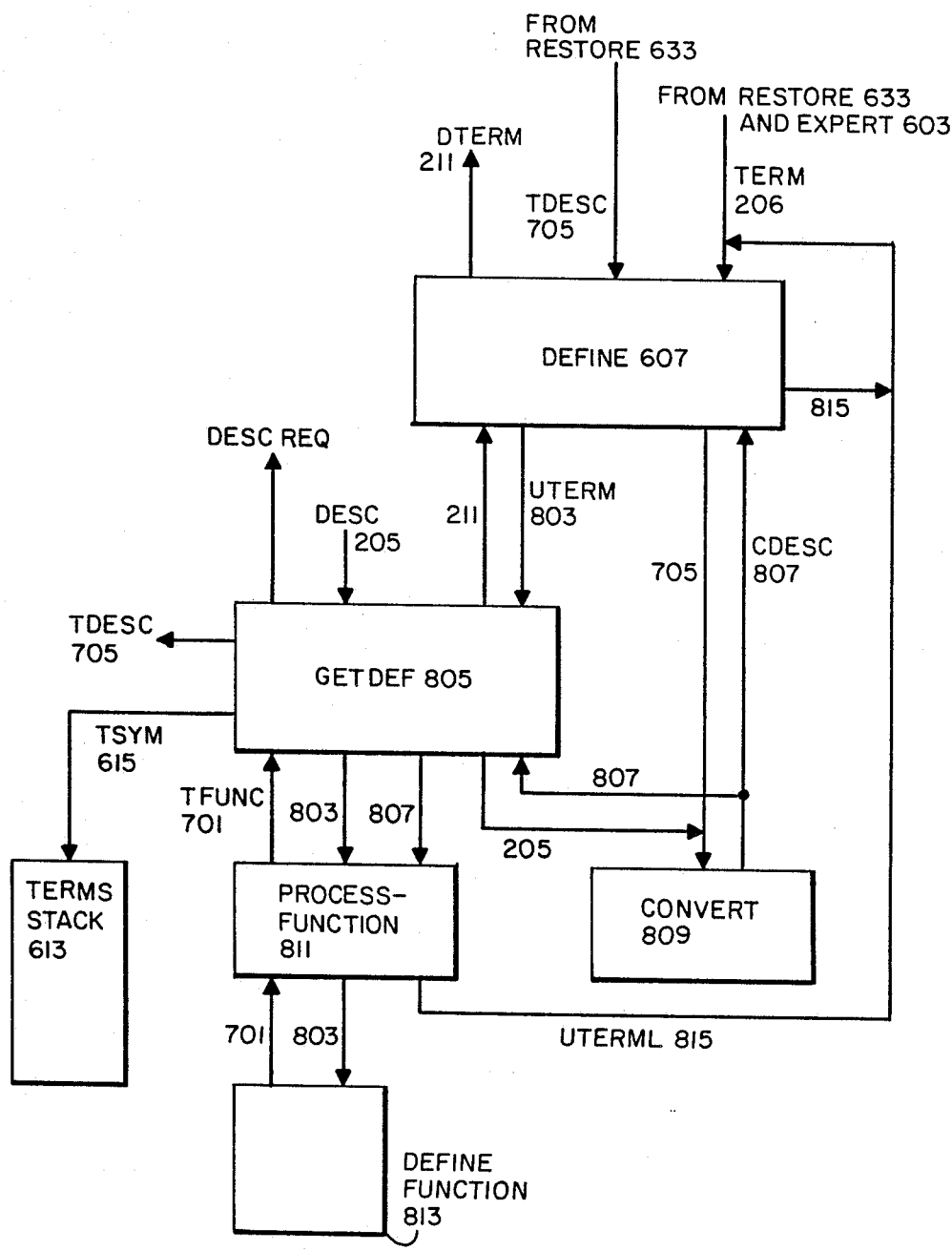
FIG. 8 is a detailed diagram of the function DEFINE of the first prototype embodiment.

7. Detailed Description of DEFINE 607: FIG. 8

FIG. 8 shows how the DEFINE functions and functions invoked by it recursively create the hierarchy of TDEFs 617 for a given set of TSYMs 615. As previously mentioned, the manner in in which DEFINE creates the hierarchy of TDEFs 617 guarantees that each TERM 206 is completely defined and that a given TERM 206 has only a single definition.

FIG. 8 shows DEFINE, the major functions invoked by DEFINE, and the manner in which the data from which TSYMs 615 and TDEFs 617 are created flows between the functions.

DEFINE 607 produces DTERMs 211 from TERMs 206. When DEFINE returns DTERM 211, TSYM 615 and TDEF 617 corresponding to DTERM 211 have been created. DEFINE 607 is invoked by EXPERT 603 and RESTORE 633; additionally, it is recursively invoked by itself and by PROCESS-FUNCTION 811. EXPERT 603 provides CFORM 605 containing the DEFINE symbol and a TERM 206 to be defined; RESTORE 633 provides a CFORM 605 containing the DEFINE symbol and a TERM 206 which is a copy of a previously saved DTERM 211 and a copy of TDESC 705 for that DTERM 211. When DEFINE 607 is recursively invoked, its input is a TERM 206 which is is used in the DESC 205 of another TERM 206 being defined.

Generally speaking, TERM 206 is a single symbol; however, when DESC 205 includes a case statement, TERM 206 may be a list; in that case, DEFINE invokes CONVERT 809 to convert the list to a LISP form and then recursively invokes itself to define each of the undefined TERMs 206 in the LISP form. Next, DEFINE 607 determines whether TERM 206 is a LISP symbol; if it is not, DEFINE 607 simply returns TERM 206 unchanged. If it is, DEFINE 607 determines whether TERM 206 was provided by RESTORE 633; if it was, DEFINE 607 provides TERM 206 and the copy of TDESC 705 to GETDEF 805 and returns the value returned by GETDEF 805, namely a list whose element is TERM 206. If TERM 206 was not provided by RESTORE 603, DEFINE 607 determines whether there is already a TSYM 615 for TERM 206 or if TERM 206 is a literal (i.e, there was no copy of TDESC 705). If either is the case, DEFINE returns a list whose element is TERM 206. If none of the other cases was true, GETDEF 805 is invoked by DEFINE 607 without a copy of TDESC 705.

GETDEF 805 receives an undefined term (UTERM) 803 from DEFINE 607 and may also receive a copy of TDESC 705 for the term. In the first case, GETDEF obtains DESC 205 from the user; in the second case, it simply uses TDESC 705. Next it invokes CONVERT 809 to convert it to CDESC 807, which is a LISP form. Next, UTERM 803 and CDESC 807 are provided to PROCESS-FUNCTION 811, which returns TFUNC 701 for UTERM 811. Finally, GETDEF 805 places TSYM 615 on TERMS-STACK 613, and returns a list consisting of DTERM 211 corresponding to UTERM 803 to DEFINE 607.

CONVERT 809 is invoked by DEFINE 607 or GETDEF 805. It receives a DESC 205 from its invoker and converts it to a LISP form, CDESC 807, which it returns to the invoker.

PROCESS-FUNCTION 811 receives UTERM 803 and CDESC 807, passes UTERM 803 to DEFINE-FUNCTION 813, receives TFUNC 701 from DEFINE-FUNCTION 811, returns TFUNC 701 to GETDEF 805, and produces UTERML 815, which is a list of the UTERMs 803 from CDESC 807 which have not yet been defined. PROCESS-FUNCTION then invokes DEFINE 607 for each UTERM 803 on UTERML 815. DEFINE-FUNCTION 803 finally, creates and evaluates a DEFUN for TFUNC 701, thereby creating TFUNC 701, which it returns to PROCESS-FUNCTION 811, which in turn returns it to GETDEF 805.

As can be seen from the above description, recursive invocations of DEFINE 607 continue until all of the TERMs 206 required to define the TERM 206 for which DEFINE wa invoked have been defined; only at that point, DEFINE 606 returns DTERM 211 corresponding to TERM 206. Since the user of Shell 201 must define all of the TERMs 206 required to define a given TERM 206 and can give TERM 206 only a single definition, DEFINE 606 guarantees that a set of definitions for a term 206 is complete and consistent.

Figure 9:
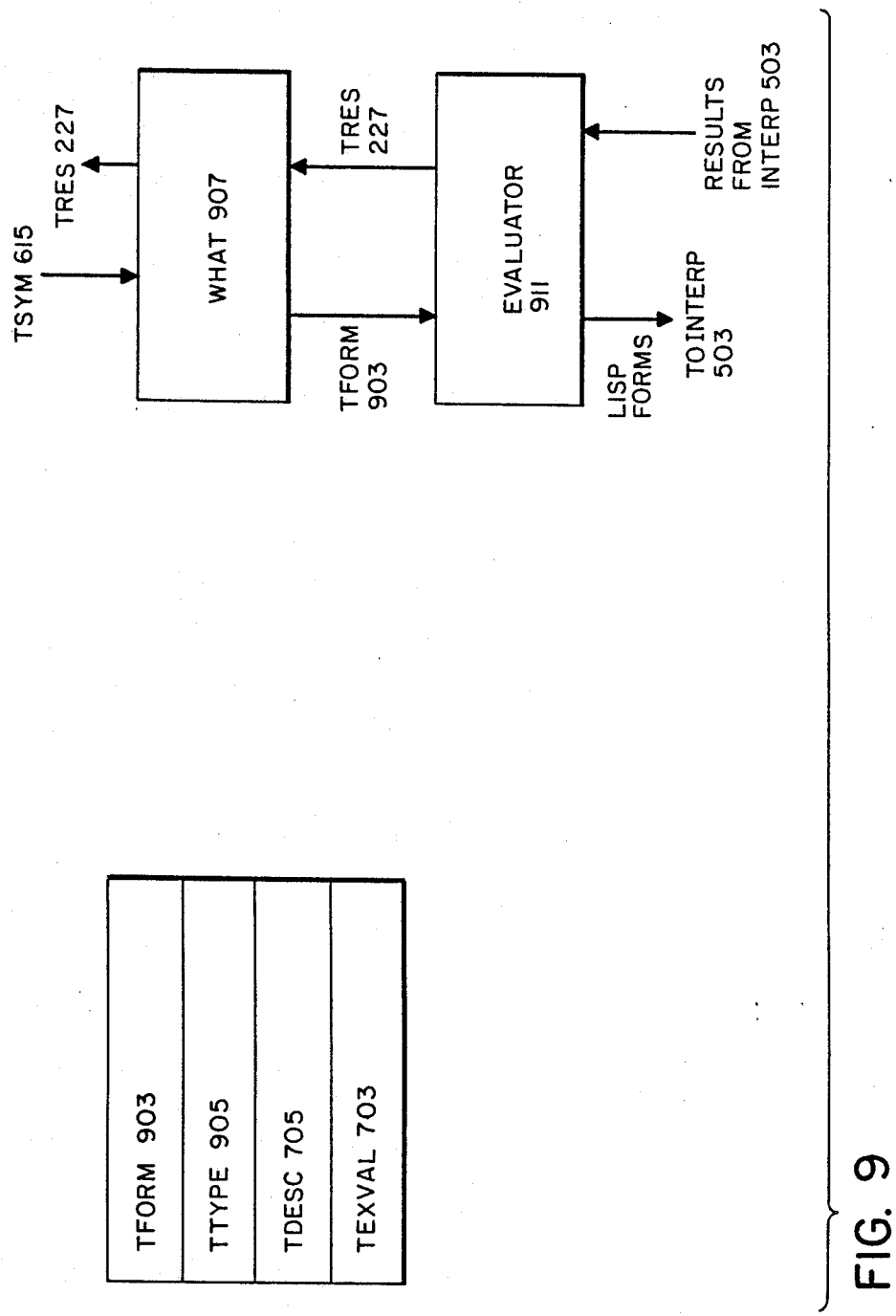
FIG. 9 is a diagram of certain improvements in the second prototype embodiment.

8. Prototype Embodiment 2: FIG. 9

Prototype embodiment 2 contains many improvements over prototype embodiment 1, including a better interface to the user and more robust recovery from user errors. Among the most important improvements included in prototype embodiment 2 are the alternate embodiments of TDEF 617 and WHAT shown in overview in FIG. 9.

TDEF 901 contains TDESC 705 and tEXVAL 703 as did TDEF 617; it does not contain TFUNC 701, and contains two new fields: TFORM 903 and TTYPE 905. The change was made to eliminate a difficulty with prototype embodiment 1: namely, that the TERM 206 to be defined might correspond to some other LISP symbol already in symbol space 505. In that case, the definition produced by DEFINE 607 for TERM 206 would supersede the previously existing definition of the symbol. The problem is solved in prototype embodiment 2 by replacing TFUNC 701 with TFORM 903, a LISP form which is not itself executable as a function but may be executed by an EVALUATOR function 911 in TIE 219. TTYPE 905 contains information about the kind of value returned when TFORM 905 is executed by EVALUATOR 911.

The remaining portion of FIG. 9 shows the relationship between WHAT function 907 and EVALUATOR 911 in prototype embodiment 2. WHAT 907 receives the WHAT CFORM 605 from EXPERT 603 as before, but instead of simply performing a LISP eval operation on TSYM 615 provided as an argument to WHAT, it provides TFORM 903 from TDEF 901 for TSYM 615 to evaluator 911 which in turn produces LISP forms to perform the operations specified in TFORM 903 and provides them to LISP interpreter 503. LISP interpreter 503 returns the results of the evaluation of the LISP forms to evaluator 911, which then makes these results into TRES 227, which it returns to WHAT 907, which in turn returns it to the user.

9. Further Development of Definition based Expert Systems

Further experience with and development of the definition-based expert system described in the foregoing portion of the present patent application has shown that definition-based expert systems are even more broadly applicable than previously thought. The further development has also resulted in the creation of a number of new operations which may be specified in the definition of a term and the development of new value types. The following additional material will first explain how a definition-based expert system may be employed as an application development system and how certain of the new operations greatly increase the usefulness of such a definition based expert system and will then disclose other new operations and the new value types.

10. Application Development Systems Employing Definition-based Expert System

Historically, applications for computers have been written in languages such as COBOL or C by computer programmers with specialized knowledge of those languages and of the computer system the application is being developed for. This fact has had a number of undersirable consequences. First, writing applications in standard computer languages is a laborious process; even a simple application may require thousands of statements. Second, the technical skills required for programming in the standard programming languages have made programmers scarce and expensive. Third, and perhaps most important, there have been communication difficulties between the programmers, who understand programming languages and computer systems, but not the task the application program is intended to perform, and the intended users of the application program, who understand the task, but know nothing of programming languages and computer systems. As a consequence, it often happens that an application program must be rewritten several times before it does what its users want it to do.

The problems described above had lead in recent years to the creation of application development systems which are task-oriented, i.e., they describe an application in terms familiar to those who work in the area the application is intended for. The advantages of such an application development system are clear: in many cases, the applications can be developed by their users and programmers are no longer required. Even where programmers are still required, the use of a task-oriented application development system reduces the probability of design errors, simplifies communication between the programmer and the users, and greatly reduces the amount of code that must be written.

The definitional expert system described in the present patent application is an example of such a task-oriented application development system. While prior-art rule-based expert systems often required specialized knowledge engineers and computer programms, the definition-based expert system of the present patent application can be developed by anyone who can express a body of knowledge as a hierarchy of definitions. For example, as shown in the patent application, a lawyer who understands the legal definition of fraud can develop a definitional expert system which permits a lay person to interactively determine whether a fraud has occurred. Similarly, a banker who understands how his bank determines whether to grant a loan to an applicant can develop a definitional expert system to interactively determine whether a loan should be granted.

The usefulness of the definitional expert system as a task-oriented application development system has been greatly increased by certain new operators in definitions which cause the computer system to perform operations in addition to obtaining values when the term to which the definition belongs is evaluated. With the addition of these new operators, the definitional expert system has become a general application development system for developing highly-interactive applications. An example of such an application is one which might be termed an "automatic realtor". The application interactively prompts the user to provide information concerning the user's space requirements, architectural preferences, and financial circumstances and then shows the user images of houses which are presently on the market and meet the user's requirements.

11. The "Side Effect" Operators

As explained in the foregoing patent application, when term inference engine (TIE) 219 (FIG. 2) responds to a WHAT inference engine command 217 to produce an expert response regarding a particular defined term (DTERM) 211, it produces the expert response by evaluating defined term 211's definition (DEF) 213. If that definition involves other defined terms 211, the definitions 213 for those terms are evaluated until every defined term 211 in the hierarchy of definitions for the particular defined term 211 has been evaluated. As may be seen from the above, every DEF 213 must return a value when the definition is evaluated. However, the evaluation of a definition may do more than produce a value. For example, the ASK operator as disclosed in the foregoing patent application has the form:

ASK NUMBER "prompt string"

When a term 211 whose definition 213 includes this operator is evaluated, the prompt specified by "prompt string" is output to the display and the user's response to the prompt is returned as the value of the operator. In this case, evaluating the term 211 not only resulted in the return of the value specified by the user's response, but also resulted in the performance of display-related operations including the output of the prompt to the display and receiving the input value. These other operations are termed generally "side effects" because they are side effects of the evaluation of definition 213.

In the course of the further development of the definition-based expert system, it has turned out to be useful to include operators whose primary purpose is the side effects they produce. In a presently-preferred embodiment, each of these operators gives the term it is used to define the Boolean value TRUE when the operation succeeds and otherwise indicates an error. Moreover, information required for the operation may itself be specified by means of a term 211. The operators in a presently preferred embodiment include the following:

COPY copies one file specified in the operator to another file specified therein.

DELETE deletes a file specified in the operator.

DISPLAY displays information on the display. The source of the information may be a text string defined in the operator, a text file, or an image.

PRINT prints a text expression specified in the operator to a file specified in the operator.

RENAME renames a file specified in the operator.

A detailed discussion of the DISPLAY operator will serve to exemplify the principles involved in the above operators.

12. Detailed Discussion of the DISPLAY Operator

In the following, a discussion of the syntax and function of the DISPLAY operator will be followed by a discussion of the implementation of the operator. The syntax of the DISPLAY operator will be shown using the following conventions:

1. Upper-case names indicate terms 211 or expressions. An expression may be anything which has a value, including a term 211.

2. Square brackets indicate optional items.

In a presently preferred embodiment, there are two classes of the DISPLAY operator. Evaluation of a term 211 defined with class of the operators results in the display of text the other results in the display of an image. Beginning with the first class, there are two operators: DISPLAY and DISPLAY FILE. With the DISPLAY operator, the displayed text is internal to the definition-based expert system; with the DISPLAY FILE operator, the text is contained in a MSDOS file.

The syntax of the DISPLAY operator is as follows:

display TEXT-EXPRESSION [TEXT-EXPRESSION . . .]

DISPLAY thus specifies a list of one or more text expressions to be displayed. The text expression may be any construct in the definion-based expert system which yields a text string as a value. The expression may thus be a constant, a term 211 which evaluates to a text string, or a combination of constants, terms 211, and operators which yield text string results. Of course, as in other definitions, if a term 211 in the DISPLAY operator has not yet been defined, definition processor 207 will request a definition for the term. For example, a term 211 SAY_HI defined with the following display operator:

display "Hi"

would, when evaluated, cause "Hi" to appear on the display.

With DISPLAY FILE, the text is contained in an MSDOS file external to the definition-based expert system. The syntax of DISPLAY FILE is display file TEXT-EXPRESSION For this operator, the value of TEXT-EXPRESSION must be the name of a MSDOS text file. Evaluation of the term 211 defined with this operator causes the contents of the file identified by TEXT-EXPRESSION to appear on the display.

The first of the two display operators for images is DISPLAY PICTURE, which displays an image which is stored in a MSDOS file in one of a number of standard image formats. The syntax is as follows:

display picture TEXT-EXPRESSION [SIZE]

The value of TEXT-EXPRESSION must be the name of an MSDOS file containing the image. SIZE may have one of four values which determine the initial size of the image: tiny, small, normal, and large. When the term 211 defined with the operator is evaluated, the image in the file appears on the display.

The second display operator for images displays an image which is provided by a Wang Laboratories, Inc. image management system called PC-WIIS. PC-WIIS is implemented in personal computers of the IBM PC type which are running the MSDOS WINDOWS display management system. The operator has the syntax:

display "*WIIS*" TEXT-EXPRESSION

In this case, the value of TEXT-EXPRESSION must be the pathname of a PC-WIIS image file. When the term 211 defined with this operator is evaluated, PC-WIIS displays the image in the file on the display.

The side effect operators, like the operators previously discussed in the application, are implemented by means of LISP functions which are stored in LISP environment 501 (FIG. 5) and executed by LISP interpreter 603. LISP environment 501 includes built-in LISP functions which open MSDOS files, close them, read them, delete them, and indicate whether a given MSDOS file exists. These functions are used to implement the LISP functions for the DELETE, RENAME, DISPLAY, and DISPLAY FILE operators. The other functions are implemented by means of a built-in LISP sys:dos function which specifies a program to be executed by MSDOS and parameters for the program. When the LISP interpreter executes the sys:dos function, the result is a software interrupt to MSDOS, which interrupts execution of the LISP interpreter and executes the program specified in the sys:dos function. At the end of execution of the program specified in the sys:dos function, execution of the LISP interpreter resumes.

The DISPLAY operators for images may serve as examples of the use of sys:dos. In the case of DISPLAY PICTURE, the program executed by means of sys:dos determines the format of the image to be displayed and then displays the image; after the display execution of the LISP interpreter resumes. In the case of the version of DISPLAY used to display PC-WIIS images, the operator presupposes that the user first executes the MSDOS WINDOWS display management program, then executes PC-WIIS from MSDOS WINDOWS as required to initialize the PC-WIIS image system, and thereupon executes the definition-based expert system of the present invintion out of MSDOS WINDOWS. Under these circumstances, the LISP sys:dos function results in the execution of the program specified in the sys:dos function under MSDOS windows. In a preferred embodiment, the program specified in the sys:dos function simply calls a PC-WIIS routine which opens the image file specified in the function, calls another PC-WIIS routine which displays the image in the on the display, and then responds to a keystroke input by the user by calling a third PC-WIIS routine which closes the image file and then returning. Upon return, the LISP interpreter again resumes. In the automatic realtor application discussed above, the images of the houses are managed by PC-WIIS, and the DISPLAY "*WIIS*" operator causes the display of the images.

13. The CALL Operator

The CALL operator specifies a non-LISP function which is invoked when the term 211 defined with the operator is evaluated. The value returned by the function becomes the value of the term. As is apparent from the foregoing, the non-LISP function may either be invoked primarily for the value it returns or for the side effects which are produced by its execution. The operator has the following syntax:

call TEXT-EXPRESSION [, using SPEC-LIST][, returning NUMBER-SPEC]

When evaluated, TEXT-EXPRESSION must yield the name of the non LISP function being invoked. The function may be any function which follows the interface standards of the C programming language. SPEC-LIST is a list of expressions specifying the values of the actual arguments for the non LISP function being invoked. In a preferred embodiment, the expressions must have scalar or string values. When the non-LISP function is a mathematical function, the type of the value it returns may be specified using NUMBER-SPEC. The choices are double, float, int, long, unsigned int, and unsigned long. The default is int.

In a preferred embodiment, the call operator is implemented using an external program interface which permits the LISP interpreter to make calls to non-LISP programs when no operating system intervention is required for the call. The external program interface includes an EPI.EXE file which includes executable code for all of the functions specified in call operators and executable code which sets up and performs the calls. New functions are added to the EPI.EXE file simply by using a linker to link their executable code into EPI.EXE. Setting up and performing a call in a preferred embodiment is complicated by the fact that the LISP interpreter runs in protected mode in extended memory, while the executable code in EPI.EXE execute in real mode in base memory. Consequently, when a term 211 defined with the call operator is evaluated, the processor must switch from protected to real mode and the code in EPI.EXE which calls the function specified in the call operator must copy the values of the actual arguments from extended memory to base memory, performing any necessary type conversions as it does so. On return, the reverse happens: the code in EPI.EXE must copy the values of the actual arguments and the returned value from base memory to extended memory, performing any type conversions as it does so, and on return from EPI.EXE, the processor must switch from real mode to protected mode.

14. Table Terms and Values

The definition based expert system as described in the parent of the present application permitted terms 211 having Boolean, arithmetic, and character-string values and defined operations involving those value types. The improved definition-based expert system described herein further permits definition of terms 211 as tables and fields in tables and operations on table values. A table is arranged in rows and columns. Each column is specified by a term 211, and the values contained in one of the colmns serve as a key by means of which a given row may be selected. For example, a term 211 called CLIENTS might have columns specified by the terms 211 NAME, ADDRESS, nd TELEPHONE and a row for each client. The row for a single client might look like this:

| NAME | ADDRESS | PHONE |
|---|---|---|
| Smith, John | 303 W. First St., New York, NY. | 301-666-5555 |

If NAME served as the key, the row could be specified by means of "Smith, John".

In the improved definition based expert, a term may represent one of two kinds of tables. The first kind is a base table. Base tables actually contain data values. The data values may be specified in definition 213 of the base table, may be obtained from the user by means of the ASK operator, or may be obtained from an external file. The second kind is a query table. A query table is a table which is produced by a query operation from a base table or another query table. For instance, a table NEW_YORK_CLIENTS might be defined from CLIENTS by running a query operation which extracted all rows from CLIENTS in which ADDRESS specified New York, N.Y.

Table operators may used with either kind of table. The operators include the following:

Look-up operators for obtaining the value of a field specified by a term 211 from a row;

aggregate operators for obtaining values derived from all of the fields in a table specified by a given term 211;

quantifying operators for obtaining Boolean values derived from all of the fields in a table specified by a given term 211.

The following will first deal with the definition of base tables, then with the definition of query tables, and finally with the table operators.

15. Defining Base Tables

In a preferred embodiment, the syntax used to define a term 211 as having a base table as its value may define a base table which employs a numeric key field or one which employs a character-string key field:

table with number key NUMBER-TERM
table with text key TEXT-TERM

In the case of the base table with the numeric key field, NUMBER-TERM is the term 211 which identifies the column of the table whose numeric values will be used as keys; in the case of the base table with the text key field, TEXT-TERM is the term 211 which identifies the column of the table whose text values will be used as keys. The table operator which defines CLIENTS looks like this:

table with text key NAME

Terms 211 identifying columns in the table are defined by means of the FIELD OF operator. The syntax depends on whether the values are specified in definition 213 or are obtained externally. In the first case, the syntax is:

field of TABLE-TERM, values VALUE-LIST

The TABLE-TERM is a term 211 representing a table value; the values in VALUE-LIST are constants have the type required by the values contained in the column identified by the term 211 being defined. If the field being defined was specified as a key in the table definition, the number of values in the list determines the number of rows in the table. For example, in the case of CLIENTS, the field NAME might be defined like this:

field of CLIENTS, values "Smith, Adam" "Smith, John" "Smith, David"

defines a CLIENTS table with three rows.

The syntax for specifying that the values for a column of a table are to be obtained externally is the following:

field of TABLE-TERM, ask [QUOTED-TEXT [, for every TABLE-OR-QUERY-EXPRESSION]]]

TABLE-TERM is again the term 211 for the base table in which the term 211 being defined specifies a column. "ask" indicates that the values for the specified column are to be obtainued interactively from a user at a terminal. QUOTED-TEXT specifies a prompt string to be output when the user is asked. If nothing further is specified, the definition-based expert system will output any prompt and the value of the key field for the row and wait for user input. For example, ADDRESS might be defined like this:

field of CLIENTS, ask "What is the address of"

For each row in CLIENTS, the expert system will output the prompt followed by the value of NAME for that row and wait for the user to provide the address. As will be explained in more detail below, The inputs may be restricted to rows meeting specific criteria by means of the optional "for every TABLE-OR-QUERY-EXPRESSION". For example, ADDRESS in CLIENTS might be defined as follows:

field of CLIENTS, ask "Please input the address of", for every CLIENTS where NAME is "Smith, John"

This will cause the user to be asked only for John Smith's address, and that address will be written to the ADDRESS field of the row containing "Smith, John" as its NAME value. As may be seen from the foregoing a given table may have columns filled using ASK and others filled using VALUES. If ASK is used to fill fields specified as a key in the table definition, the size of the table will depend on the number of fields filled.

Additionally, a term 211 may be defined as a table which is stored in a MS-DOS file. In that case, definition 213 is as follows:

dosfile table

The expert system shell of the present invention responds to such a definition with a sequence of menus which permit the developer of the application to specify which MS-DOS file contains the table's data and how the terms 211 defining columns in the table relate to fields in the MS-DOS file. Definitions for such tables do not contain ask operators or value operators.

16. Defining Query Tables

A query table is a query table which is defined by means of a query operation on a base table or another query table. The syntax of the query table definition is the following:

TABLE-OR-QUERY-TERM where BOOLEAN-EXPRESSION

The TABLE-OR-QUERY-TERM specifies the base or query table from which the rows are selected; the BOOLEAN-EXPRESSION specifies the condition under which a row is to be selected. For example, NON_JOHN_SMITH_TABLE could be defined as follows:

CLIENTS where NAME is not "Smith, John"

The resulting query table will have all of the rows of CLIENTS except the row where NAME has the value "Smith, John". As noted above, the "where BOOLEAN-EXPRESSION" operator may also be used to control which rows are selected for interactive input to a base table using the "ask" operator.

17. Operations on Tables

Once a table has been defined as set forth above, terms 211 may be defined by specifying operations on the table. The simplest operation is selecting a field from a specified row. The operator that does this is the OF operator:

FIELD-NAME-TERM of ROW-SPECIFYING-TERM

The FIELD-NAME-TERM is the term 211 identifying a field in the row. The ROW-SPECIFYING-TERM is a term 211 whose definition specifies a single row. definition 213 may thus define a base table having only a single row or a query table having only a single row. For example, the query table JOHN_SMITH_TABLE might be defined as CLIENTS where NAME is "Smith, John"

JOHN_SMITH_TABLE thus consists of a single row, and an of operator defining a term JOHN_SMITH_ADDRESS would look like this:

ADDRESS of JOHN_SMITH_TABLE

Aggregate operators are operators which produce a result based on part or all of the data contained in a column of a table. The operators return text, arithmetic, or Boolean values. The text aggregate operator is COLLECT, which makes a text string consisting of values from a column. A new-line character is appended to the end of each value in the string. The operator has the syntax:

collect FIELD-TERM-TEXT-EXPRESSION for every TABLE-OR-QUERY-EXPRESSION

FIELD-TERM-TEXT-EXPRESSION is an expression whose definition involves a term 211 which identifies a column in the table specified by TABLE-OR-QUERY-EXPRESSION. The COLLECT operator then makes a text string as specified by FIELD-TERM-NAME-EXPRESSION of the values in the field. Here and in the following, TABLE-OR-QUERY-EXPRESSION may of course include a WHERE operator as described above. For instance, a term 211 NAME_LIST might be defined like this:

collect NAME for every CLIENTS

NAME_LIST would have the character-string value
"Smith, Adam
Smith, John
Smith, David"

An important aspect of the fact that an expression involving a field name can be used in the COLLECT operator is that the value defined by the COLLECT operator may be computed from the value returned from the fields.

The arithmetic aggregate operators include operators for obtaining the average of the values in the fields, the maximum of the values in the fields, the minimum of the values in the fields, the total of the values in the fields, the number of fields, and the percent of the fields meeting a given condition. The average operator can stand as an example for average, maximum, minimum, and total. The syntax is the following:

average FIELD-TERM-NUMBER-EXPRESSION for every TABLE-OR-QUERY-EXPRESSION

FIELD-TERM-NUMBER-EXPRESSION is an expression whose evaluation involves a term 211 specifying a number field in a base table or query table defined by TABLE-OR-QUERY-EXPRESSION. Again, the use of an expression involoving the field term permits specification of computation on the result returned by the operator.

The COUNT EVERY operator simply counts the number of rows in a specified table. The syntax is as follows:

count every TABLE-OR-QUERY-EXPRESSION

For example, a term 211 NUMBER_OF_CLIENTS could be defined as follows:

count every CLIENTS

With the table CLIENTS of the present example, NUMBER_OF_CLIENTS would have the value 3.

The PERCENT WHERE operator determines what percentage of the values of a specified field in a table fulfill a specified condition. The operator has the syntax percent TABLE-OR-QUERY-TERM where FIELD-TERM-BOOLEAN-EXPRESSION TABLE-OR-QUERY-TERM specifies the base table or query table upon which the operation is being performed, and FIELD-TERM-BOOLEAN-EXPRESSION is a Boolean expression involving a term 211 specifying one of the fields in the specified table. For instance, a PERCENT_JOHN_SMITH term 211 might be defined as follows:

percent CLIENTS where NAME is "Smith, John"

PERCENT_JOHN_SMITH would have the value "33" because "Smith, John" is one of three rows in the table.

The Boolean aggregate value operators are FOR EVERY, which determines whether a Boolean expression involving a term 211 which is a field name is true for every row of the table, and FOR SOME, which determines whether such a Boolean expression is true for any row of the table. The syntax of FOR SOME is exemplary for both:

for some TABLE-OR-QUERY-EXPRESSION, FIELD-TERM-BOOLEAN-EXPRESSION

TABLE-OR-QUERY-EXPRESSION specifies the base table or query table upon which the operation is being performed and the FIELD-TERM-BOOLEAN-EXPRESSION is a Boolean expression involving a term 211 specifying a field in the table. An example would be a definition for a term IS_JOHN_SMITH_THERE?, which would look like this:

for some CLIENTS, NAME is "Smith, John"

As may be seen from the foregoing table values and table terms 211 represent a major enhancement of the rule-based expert system. Terms 211 may now represent ordered collections of data and fields within the collections, and operators on tables permit the definition of query tables and operations which for both types of tables permit retrieval of individual field values and computation of results depending on the values in an entire column.

18. "Don't Know" Values

A problem of the definition-based expert system as originally implemented was that it could not adequately handle user responses which indicated that the user did not know the answer to a question addressed him by the expert system. This problem has been overcome by permitting designers of the definition-based expert systems of the present invention to add a "don't know" value to each of the classes of scalar values used in the definition based expert system and add the notion of "don't know dependency" for scalar values and table values which are not themselves "don't know" values but are dependent on "don't know" values. Where "don't know" values are specified, users of the system may provide "don't know" as a possible input to the system. Provision of the value in a preferred embodiment is by means of a function key or by means of selection from a drop-down menu.

For example, if "don't know" values are specified and the field PHONE of CLIENTS is defined as follows:

field of CLIENTS, ask "What is the telephone number of"

the user can specify "Don't know". If the user so specifies, the value of PHONE for that field is "Don't know". Assuming that "Don't know" was the answer for the row for which NAME has the value "Smith, John", a term 211 JOHN_SMITH_PHONE defined with PHONE of JOHN_SMITH_TABLE would specify PHONE for that row and would have the value "Don't know". Further, the value of a term 211 PHONE_LIST defined for the field PHONE with the COLLECT operator would be "don't know dependent" because at least one of the values in the column defined by PHONE is a "don't know" value. Assuming that only John Smith's phone was not known, the PHONE_LIST definition collect PHONE for every CLIENTS would yield a value like:

"555-1111
    666-2222"

Moreover, the definition-based expert system will associate a "don't know" dependency indication with the value, i.e., an indication that a "Don't know" value was involved in its computation. In this case, the indication specifies two things: the location in the value which would have been occupied by the "don't know" value and that one of the three fields in the column has a "don't know" value.

Evaluation of a term 211 defined with almost an operator available in the definition-based expert system may involve evaluation of another term 211 which has a "don't know" value. In a preferred embodiment, the general rules for the determination of the value of a term 211 where a "don't know" value is involved are the following:

1. If the value of the result is independent of the "don't know" value, the result is returned without any indication of don't know dependencies.
2. If the value of the result is dependent from the "don't know" value and no value can be determined without the "don't know" value, the returned result is "don't know" with an indication of "don't know" dependencies.
3. If the value of the result is dependent from the "don't know" value but some value can be determined without the "don't know" value, the returned result is the value so determined with an indication of "don't know" dependencies Such a result is termed an estimate.

An example for the first two rules is given by the behavior of the MULTIPLY operator indicated by "*" when one of its operands has a value of "don't know.". If the other operand has the value 0, the operator returns 0, since that result is independent of the value of the other operand. Otherwise, the MULTIPLY operator returns "don't know". An example for the third rule is the COLLECT operator. As shown by the example, if a field of the collected column has the value "don't know", COLLECT ignores that field when it makes the result string.

The indication of "don't know" dependencies which is returned along with "don't know" or an estimate includes the term 211 from the hierarchy of definitions for the term 211 being evaluated whose value is directly dependent on "don't know" and when the value is an estimate, estimate information which indicates the extent to which the estimate is affected by "don't know" values. The content of the estimate information depends on the operator which produced the estimate. Generally speaking, when the estimate is a string value, the estimate information includes the index of the position in the string which the first component having a "don't know" value would have occupied. When the estimate is produced by an operator such as AVERAGE which examines the contents of all of the fields of a column, the estimate information includes the total number of fields of the column and the number of fields with "don't know" values. An operator such as COLLECT, which both produces a string and examines the contents of all of the fields of a column, has estimate information including both the position of the first "don't know" value in the result string and the total number of fields and the number of fields with "don't know" values.

In a preferred embodiment, there are two special Boolean operators which permit detection of "don't know" values and estimates. The first detects "don't know" values and has the syntax:

TEXT-NUMBER-BOOLEAN-EXPRESSION=- don't know

The operator returns the value TRUE if the expression has the value "don't know" and otherwise returns false. An example of its use would be in a definition of DONT_KNOW_ABOUT_JOHN_SMITH_PHONE which looked like this:

JOHN_SMITH_PHONE=don't know

Since the value of JOHN_SMITH_PHONE is the value of the PHONE field for John Smith's row of CLIENTS, DONT_KNOW_ABOUT_JOHN_SMITH_PHONE has the value TRUE. The second detects estimates and has the syntax:

TEXT-NUMBER-BOOLEAN-EXPRESSION=- don't know estimate

The operator returns the value TRUE if the expression is an estimate and otherwise returns FALSE An example of its use would be a definition of PHONE_LIST_INCOMPLETE which looked like this:

PHONE_LIST=don't know estimate

Here, PHONE_LIST is an estimate, so PHONE_LIST_INCOMPLETE will have the value TRUE.

19. Implementation of Don't Know Values

As previously pointed out, operators are implemented in a preferred embodiment by means of LISP functions. In the preferred embodiment, the functions for the operators return lists. The implementation of "don't know" values in a preferred embodiment takes advantage of this feature and of a built-in LISP special symbol, NIL. The value of NIL in LISP is the empty list and, in contexts requiring Boolean values, the value FALSE. NIL is used in the preferred embodiment to represent "don't know". To distingtuish NIL from Boolean values, the present embodiment has defined yes-no operations. These operations work like Boolean operations, except that the LISP Boolean primitive symbol T has been replaced by the symbol YES and the Boolean primitive symbol NIL has been replaced by the symbol NO.

In the preferred embodiment, the list returned by a function always has as its first element the value required by the term 211 defined by means of the function. If there are "don't know" dependencies, the first element will itself be a list. The first element of that list will be the returned value, i.e., either NIL representing "don't know" or an estimate. The next element is the don't know dependency indication. If the returned value is NIL, the dependency indication is a list of the terms 211 whose "don't know" values made return of the "don't know" value necessary. If the returned value is an estimate, the dependency indication is a list in which each element is a list consisting of a term whose "don't know" values made the estimate necessary and the estimate information. For example, the required value returned by PHONE_LIST would be a list of the following form:

("555-1111
666-2222" 9 (PHONE 1 3))

The text string is of course the string made by the COLLECT function; the value 9 is the index (counting the new line character) of the position of the first "don't know" value in the text string; PHONE is the field name for the column which COLLECT read to obtain the string; 1 3, finally, indicate that there was 1 "don't know" value out of three total fields.

The advantages of a definition-based expert system with "don't know" values which have the properties just described are clear. Beyond making it possible for a user to indicate that he doesn't know, the definition-based expert system can determine whether the "don't know" makes a difference and if it does, whether an estimate is possible. Moreover, the "don't know" dependency information makes it possible for the definition-based expert system to determine which terms 211 are the sources of the dependency and in the case of the estimate, to determine to what extent the "don't know" values may affect the value for which the estimate has been made.

20. Conclusion

The foregoing sections 9-19 have disclosed numerous improvements of the definition-based expert system disclosed in sections 1-9. Among the improvements are side effect operators including a DISPLAY operator which enables applications developed with the definition-based expert system to display images managed by an external image management system, a CALL operator which enables applications to call procedures which obey the C language call interface, operators for defining tables and fields and operating on the tables, and "don't know" values for all of the non-table data types used in the definition-based expert system.

The improvements greatly increase the usability of the definition-based expert system as an application development system for the development of highly-interactive applications. With the improvements, a definition-based expert system as disclosed herein may display images, may call procedures written in languages other than LISP, may collect data into base tables, may define query tables by means of query operations, and may perform operations on the tables such as collecting the values of character-string fields and averaging the values of numeric fields. The "don't know" values, finally, make it possible to accept "don't know" input from users. Operators have been modified to accept operands with "don't know" values and the retention of "don't know" dependency indicators as well as the values produced by operations involving "don't know" values have made it possible to produce estimates in certain cases involving "don't know" values and to determine to what extent "don't know" values are involved in the estimate.

While Sections 9-19 disclose the best mode presently known to the inventors for practicing the improvements discussed therein, other embodiments are possible. For example, the definition-based expert system disclosed herein may be implemented in languages other than LISP. Further, other operators exemplifying the principles disclosed herein may be developed, and different definition syntax may be used. Similarly, other implementations of "don't know" values may be developed which follow the principles disclosed herein. This being the case, the disclosed embodiments are to be considered in all respects as illustrative and not restrictive, the scope of the invention being indicated by the appended claims rather than the foregoing description, and all changes which come within the meaning and range of equivalency of the claims are intended to be embraced therein.

What is claimed is:

1. A digital computer system operable as an expert system, said computer system comprising:

storage means to store a knowledge base including hierarchically-defined terms and their definitions, the corresponding definition of each term defining its respective term using the value of one or more terms, each of whose definitions is at a lower level of the hierarchy, and/or using one or more term-independent values which do not depend on the value of a term; and processing means for receiving commands from a user of the system, for producing inference commands in response to said user commands, for interrogating said storage means in response to said commands to obtain the definition of a given term, and for computing the value of said given term from its corresponding definition by obtaining the value of any term and any term-independent value in the corresponding definition, said system employing said computed value to produce an expert response to said user.

2. The digital computer system as set forth in claim 1 wherein:

the definition of a given term further includes an operator indicating an operation to be performed when the value of the given term is obtained.

3. The digital computer system as set forth in claim 2 wherein:

the digital computer system is operable as another system and the operation to be performed is operating the digital computer system as the other system.

4. The digital computer system as set forth in claim 3 wherein:

the digital computer system further includes display means;

the other system is a system for retrieving an image stored in the digital computer system and displaying the image on the display means; and the operation to be performed is operating the other system to retrieve and display a given image.

5. The digital computer system as set forth in claim 2 wherein:

the digital computer system further includes display means and the operation to be performed is displaying information on the display means.

6. The digital computer system as set forth in claim 5 wherein:

the information is contained within the definition of the given term.

7. The digital computer system as set forth in claim 5 wherein:

the information is text.

8. The digital computer system as set forth in claim 5 wherein:
the information is an image.

9. The digital computer system as set forth in claim 5 wherein:
the digital computer system further includes storage means external to the knowledge base; and
the information is obtained from the external storage means.

10. The digital computer system as set forth in claim 5 wherein:
the digital computer system is operable as another system; and
the information is obtained by operating the digital computer system as the other system.

11. The digital computer system as set forth in claim 1 and wherein:
the definition of a given term is a base table definition operator which defines a base table having rows and columns.

12. The digital computer system as set forth in claim 11 and wherein:
the definition of a given term is a field definition operator which defines a column in the base table.

13. The digital computer system as set forth in claim 12 and wherein:
the field definition operator further defines the manner in which the column receives its values.

14. The digital computer system as set forth in claim 13 and wherein:
the base table definition operator further defines one of the terms defining a column in the base table defined by the table definition operator as a key term and
the field definition operator for the key term further defines the number of rows in the base table from the number of values received by the column specified by the key term.

15. The digital computer system as set forth in claim 11 and wherein:
the definition of a given term includes a query operator which defines a query table made up of rows from a base table or another query table.

16. The digital computer system as set forth in claim 15 and wherein:
the definition of a given term includes a column operator for determining a result by examining a column of a base table or a query table.

17. The digital computer system as set forth in claim 1 and wherein:
the term independent values include a "don't know" value.

18. The digital computer system as set forth in claim 17 and wherein:
the value of a given term may include a "don't know" dependency indication and
the processing means computes the value of the given term from its corresponding definition when any term or term independent value has the "don't know" value according to the rule that
if the computed value of the given term is independent of any "don't know" value, the term has the computed value and does not include a "don't know" dependency indication,
if no computed value of the given term can computed without use of the "don't know" value, the term has the "don't know" value and includes a "don't know" dependency indication, and
if some computed value of the given term can be computed without use of the "don't know" value, the term has the computed value and includes a "don't know" dependency indication.

19. The digital computer system as set forth in claim 18 and wherein:
the "don't know" dependency indication includes the term of the definition which has the "don't know" value.

20. The digital computer system as set forth in claim 18 and wherein:
if some computed value of the given term can be computed without use of the "don't know" value, the "don't know" dependency indicator indicates an extent to which the computed value may be affected by the "don't know" value.

* * * * *